(12) United States Patent
Jin et al.

(10) Patent No.: US 11,729,524 B2
(45) Date of Patent: Aug. 15, 2023

(54) DEPTH SENSOR AND METHOD OF OPERATING THE SAME

(71) Applicant: SAMSUNG ELECTRONICS CO., LTD., Suwon-si (KR)

(72) Inventors: Younggu Jin, Osan-si (KR); Youngchan Kim, Seongnam-si (KR); Sung-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/726,207

(22) Filed: Apr. 21, 2022

(65) Prior Publication Data

US 2022/0377264 A1 Nov. 24, 2022

(30) Foreign Application Priority Data

May 20, 2021 (KR) .................. 10-2021-0064564

(51) Int. Cl.
| | |
|---|---|
| *H04N 25/531* | (2023.01) |
| *H04N 25/58* | (2023.01) |
| *H04N 25/75* | (2023.01) |
| *H04N 25/77* | (2023.01) |
| *H04N 25/533* | (2023.01) |
| *G01S 7/486* | (2020.01) |
| *H04N 25/766* | (2023.01) |

(52) U.S. Cl.
CPC ......... *H04N 25/531* (2023.01); *H04N 25/533* (2023.01); *H04N 25/58* (2023.01); *H04N 25/75* (2023.01); *H04N 25/766* (2023.01); *H04N 25/77* (2023.01)

(58) Field of Classification Search
CPC .... H04N 25/531; H04N 25/533; H04N 25/77; H04N 25/59; G01S 7/486; G01S 7/4863; G01S 7/4802
See application file for complete search history.

(56) References Cited

U.S. PATENT DOCUMENTS

| | | | |
|---|---|---|---|
| 9,204,143 B2 | 12/2015 | Wang et al. | |
| 10,422,879 B2 | 9/2019 | Nagai | |
| 10,498,991 B2 | 12/2019 | Van Der Tempel | |

(Continued)

FOREIGN PATENT DOCUMENTS

| | | |
|---|---|---|
| KR | 10-2017-0041187 A | 4/2017 |
| KR | 10-2020-0009643 A | 1/2020 |

(Continued)

*Primary Examiner* — Marly S Camargo
(74) *Attorney, Agent, or Firm* — Sughrue Mion, PLLC

(57) ABSTRACT

Provided is a depth sensor which includes a pixel and a row driver that controls the pixel, the pixel including a first tap, a second tap, a third tap, and a fourth tap, an overflow transistor, and a photoelectric conversion device. Each of the first tap, the second tap, the third tap, and the fourth tap includes a photo transistor, a transfer transistor, and a readout circuit. In a first integration period of a global mode, the row driver activates a second photo gate signal controlling the photo transistor of the second tap and a third photo gate signal controlling the photo transistor of the third tap. In a second integration period of the global mode, the row driver activates a first photo gate signal controlling the photo transistor of the first tap and a fourth photo gate signal controlling the photo transistor of the fourth tap.

20 Claims, 19 Drawing Sheets

(56) References Cited

U.S. PATENT DOCUMENTS

| | | | |
|---|---|---|---|
| 10,931,905 B2* | 2/2021 | Jin | G01S 17/89 |
| 11,265,498 B2* | 3/2022 | Jin | H01L 27/14612 |
| 2020/0029047 A1 | 1/2020 | Jin et al. | |
| 2020/0116825 A1 | 4/2020 | Keller et al. | |
| 2021/0157005 A1 | 5/2021 | Ercan et al. | |
| 2021/0360177 A1* | 11/2021 | Oh | H04N 25/75 |
| 2022/0018946 A1 | 1/2022 | Jin | |
| 2022/0021831 A1* | 1/2022 | Jin | G01S 7/4914 |
| 2023/0044912 A1* | 2/2023 | Arai | H04N 25/65 |

FOREIGN PATENT DOCUMENTS

| | | |
|---|---|---|
| KR | 10-2071526 B1 | 3/2020 |
| KR | 10-2020-0089310 A | 7/2020 |
| KR | 10-2022-0010192 A | 1/2022 |

\* cited by examiner

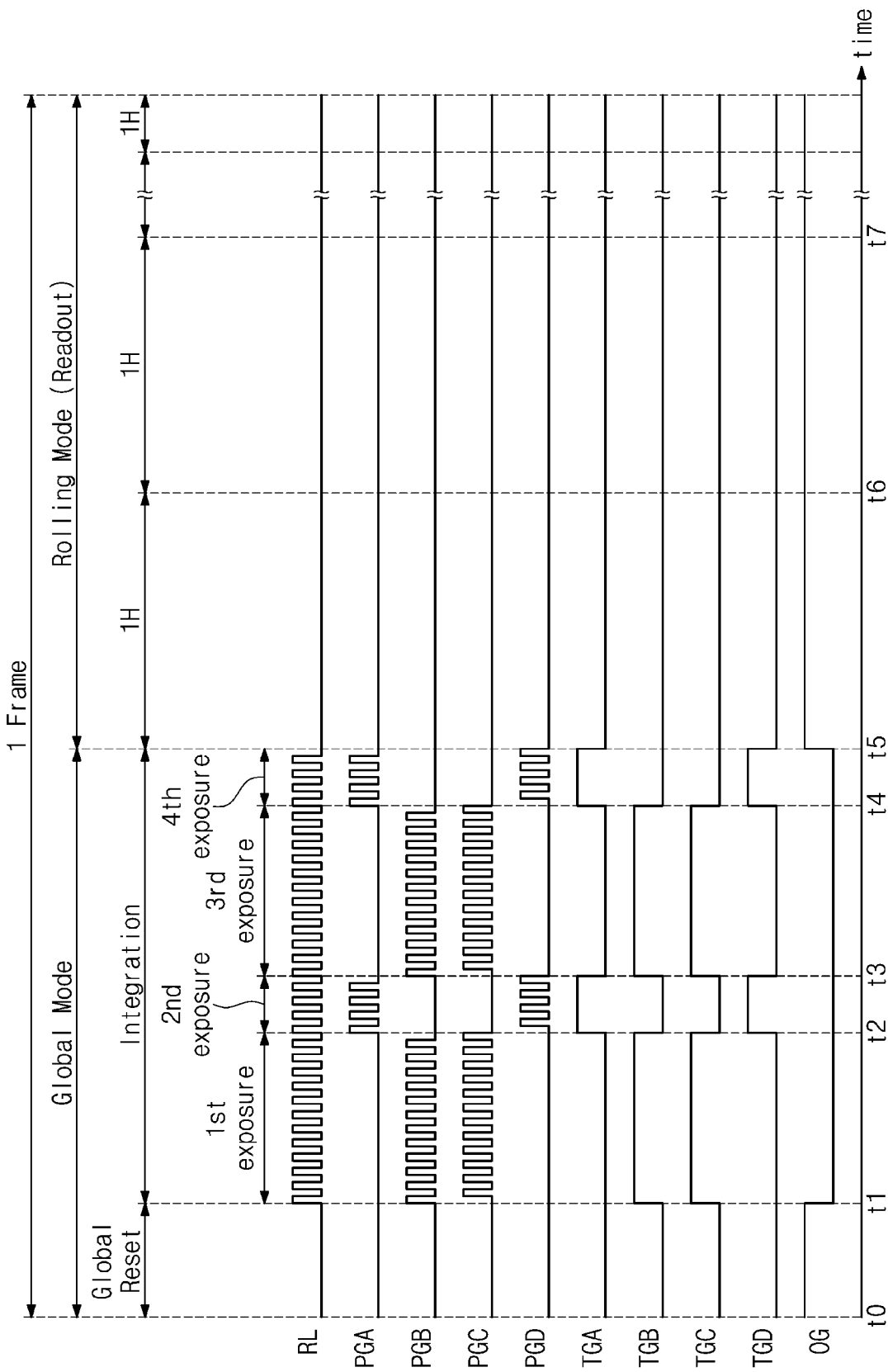

DEPTH SENSOR AND METHOD OF OPERATING THE SAME

CROSS-REFERENCE TO RELATED APPLICATIONS

This application claims priority under 35 U.S.C. § 119 to Korean Patent Application No. 10-2021-0064564 filed on May 20, 2021, in the Korean Intellectual Property Office, the disclosures of which are incorporated by reference herein in their entireties.

BACKGROUND

Example embodiments of the present disclosure relate to a depth sensor and a method of operating the depth sensor, and more particularly, relate to a depth sensor that generates output signals, which are based on charges stored during different integration periods, through only one read operation, and a method of operating the depth sensor.

An electronic device such as a smartphone may include an ambient light sensor. As an example of the ambient light sensor, a sensor that calculates a distance (i.e., a depth) from an external object by using a light source or uses an object is being used. In particular, a time-of-flight-based depth sensor may emit a light signal to an object and may generate a depth map of the object by using a light signal reflected from the object.

An appropriate exposure time of the depth sensor may be required depending on a distance between the depth sensor and the object, and both information about charges obtained during a shorter exposure time and information about charges obtained during a longer exposure time may be required to generate an accurate depth map. However, a plurality of exposures and a plurality of read operations are inevitable to obtain all of information corresponding to charges stored at different exposure times. That is, a dynamic range of the depth map and an operating speed of the depth map is in a trade-off relationship. Therefore, there is a need for a method for improving the dynamic range of the depth map as well as increasing the operating speed of the depth sensor.

SUMMARY

Embodiments of the present disclosure provide a depth sensor capable of generating output signals, which are based on charges stored during different integration periods, through only one read operation.

According to an aspect of an example embodiment, a depth sensor may include a pixel that includes a first tap, a second tap, a third tap, a fourth tap, an overflow transistor, and a photoelectric conversion device, each of the first tap, the second tap, the third tap, and the fourth tap including a photo transistor, a transfer transistor, and a readout circuit, and a row driver that controls the pixel. In a first integration period of a global mode, the row driver may activate a second photo gate signal controlling the photo transistor of the second tap and a third photo gate signal controlling the photo transistor of the third tap. In a second integration period of the global mode, the row driver may activate a first photo gate signal controlling the photo transistor of the first tap and a fourth photo gate signal controlling the photo transistor of the fourth tap.

According to an aspect of an example embodiment, a depth sensor may include a pixel that includes a first tap, a second tap, a third tap, a fourth tap, an overflow transistor connected in common with the first tap, the second tap, the third tap, and the fourth tap, and a photoelectric conversion device connected in common with the first tap, the second tap, the third tap, and the fourth tap, and a row driver that controls the pixel. In a first integration period of a global mode, the second tap and the third tap may store charges converted by the photoelectric conversion device. In a second integration period of the global mode, the first tap and the fourth tap may store charges converted by the photoelectric conversion device.

According to an aspect of an example embodiment, an operating method of a depth sensor, which include a pixel including a first tap, a second tap, a third tap, and a fourth tap and an analog processing circuit may include receiving a light signal reflected from an object, storing first charges converted by a photoelectric conversion device in the second tap and the third tap, during a first integration period of a global mode, and storing second charges converted by the photoelectric conversion device in the first tap and the fourth tap, during a second integration period of the global mode.

BRIEF DESCRIPTION OF THE FIGURES

The above and other aspects, features, and advantages of the disclosure will be more apparent from the following detailed description of example embodiments taken in conjunction with the accompanying drawings, in which:

FIGS. 9, 10, and 11 are examples of timing diagrams of signals that are applied to a pixel of FIG. 2;

DETAILED DESCRIPTION

Details of example embodiments are provided in the following detailed description with reference to the accompanying drawings.

In the detailed description, components described with reference to the terms "unit", "module", "block", "~er or ~or", etc. and function blocks illustrated in drawings will be implemented with software, hardware, or any combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or any combination thereof.

As used herein, terms such as "longer exposure" and "shorter exposure" will be understood by a person of ordinary skill in the art and will vary in some extent depending on the context in which they are used.

Figure 1:
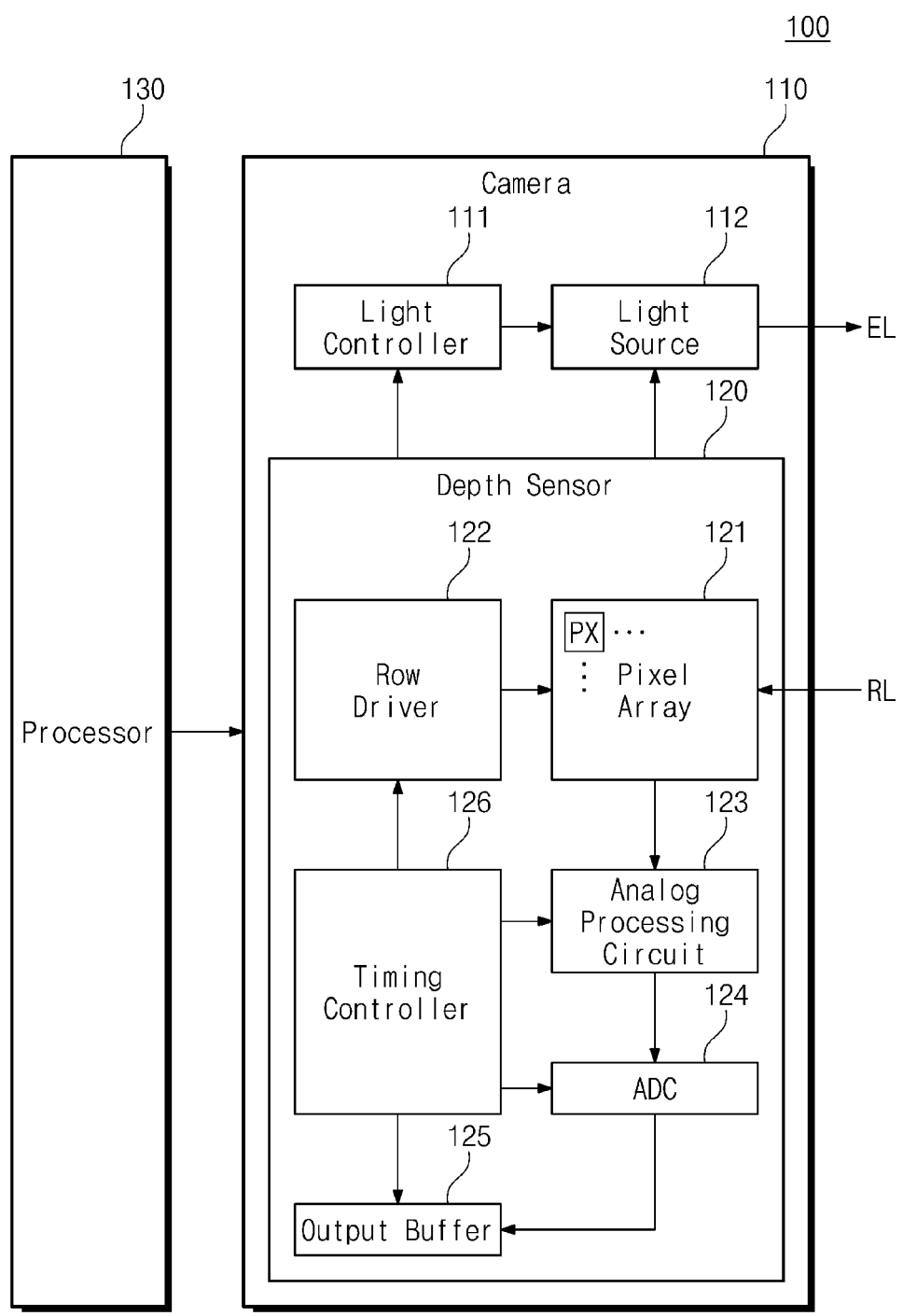
FIG. 1 illustrates an exemplary configuration of an electronic device according to an example embodiment.
Figure 2:
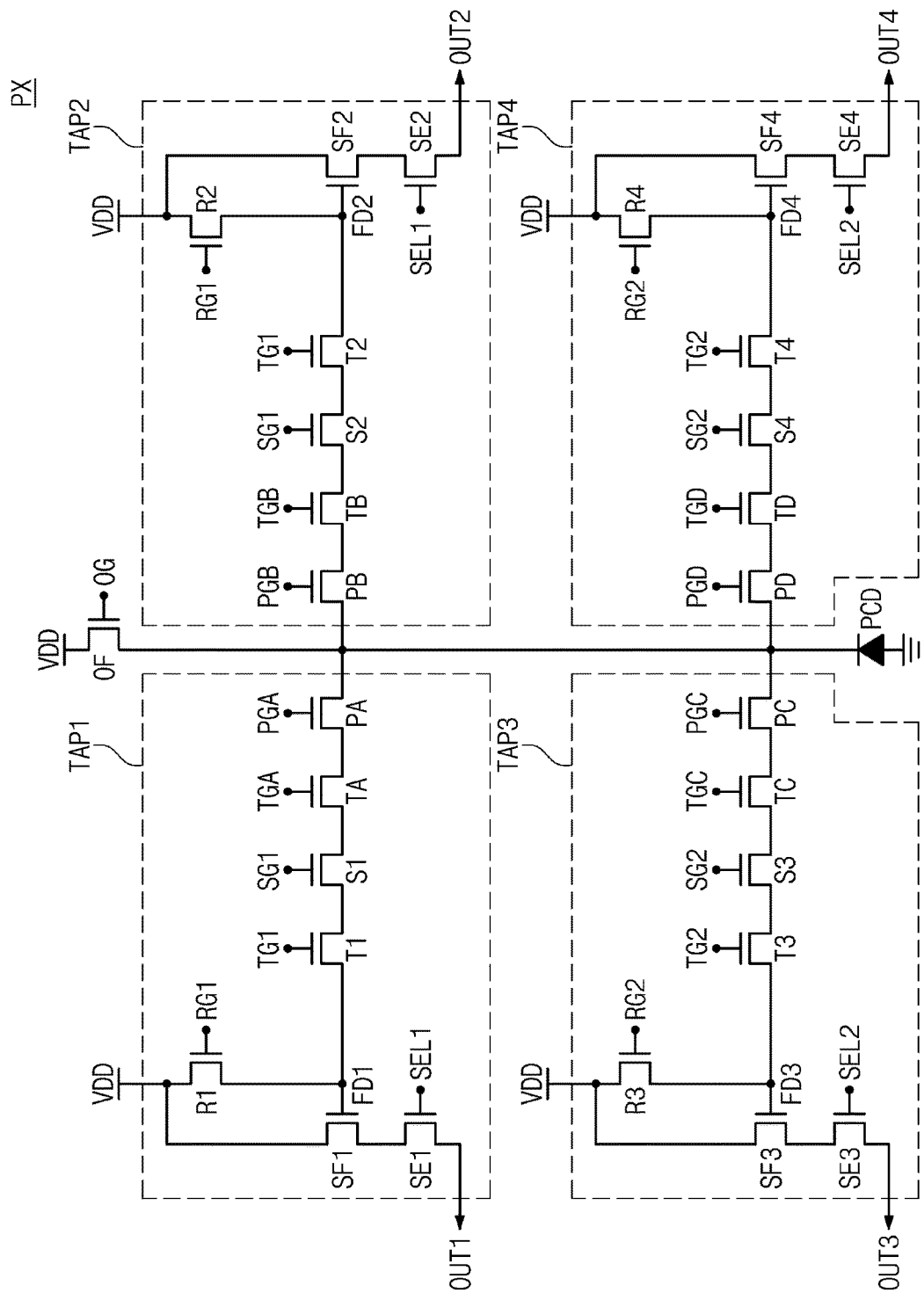
FIG. 2 is an example of a circuit diagram of a pixel of FIG. 1.

FIG. 1 illustrates a configuration of an electronic device according to an example embodiment, and FIG. 2 is an example of a circuit diagram of a pixel of FIG. 1. An electronic device 100 may be also referred to as a "computing system", an "electronic system", an "image detecting system", or a "distance detecting system". For example, the electronic device 100 may be a smartphone, a tablet, a digital camera, a wearable device, or a mobile device. The electronic device 100 may include a camera 110 and a processor 130.

The camera 110 may emit a light signal EL to an object based on a time of flight (ToF) technology, may sense a light signal RL reflected from the object, and may sense a distance between the electronic device 100 and the object. The camera 110 may include a light controller 111, a light source 112, and a depth sensor 120. The light controller 111 may control the light source 112 under control of the depth sensor 120 or the processor 130.

The light controller 111 may modulate the light signal EL to be emitted or output from the light source 112. The light source 112 may emit the light signal EL modulated by the light controller 111. For example, the light source 112 may include a light emitting diode (LED), a laser diode (LD), or an organic light emitting diode (OLED). For example, the modulated light signal EL may be a continuous wave or a pulsed wave. Alternatively, the light signal EL may be an infrared ray, a microwave, a light wave, or an ultrasonic wave. For example, when the light signal EL is a continuous wave, a duty ratio of the light signal EL may be 50%; when the light signal EL is a pulsed wave, a duty ratio of the light signal EL may be less than 50%.

The depth sensor 120 may also be referred to as an "image sensor" or a "ToF sensor". The depth sensor 120 may include a pixel array 121, a row driver 122, an analog processing circuit 123, an analog-to-digital converter 124, an output buffer 125, and a timing controller 126.

The pixel array 121 may include pixels PX arranged along a row direction and a column direction. The pixel array 121 may be implemented on a silicon substrate or a semiconductor substrate. The pixels PX may convert the light signal RL reflected from an object into an electrical signal. Due to a distance between the electronic device 100 and the object, the light signal RL incident onto the pixel array 121 may be delayed with respect to the light signal EL output from the light source 112. There may be a time difference between the light signals RL and EL. The pixel PX may integrate, store, transfer, or remove charges based on control signals provided from the row driver 122. The pixel PX may be also referred to as a "ToF pixel".

The row driver 122 may control the pixel array 121 under control of the timing controller 126. The row driver 122 may provide the control signals to the pixels PX. For example, the control signals may include signals OG, PGA to PGD, TGA to PGD, SG1 and SG2, TG1 and TG2, RG1 and RG2, SEL, etc., as illustrated in FIG. 2 or any other drawing. The row driver 122 may control all the pixels PX of the pixel array 121 at the same time in a global mode or may control the pixels PX of the pixel array 121 in units of row in a rolling mode.

The analog processing circuit 123 may receive, sample, and hold an output signal (also referred to as an "image signal" or a "depth signal") output from the pixel array 121. The analog processing circuit 123 may be connected with the pixels PX of the pixel array 121 and may control output lines extending in the column direction. The analog processing circuit 123 may perform a correlated double sampling (CDS) operation on the output signal and may remove a noise included in the output signal.

The analog-to-digital converter 124 may convert the output signal processed by the analog processing circuit 123 into a digital signal. The analog-to-digital converter 124 may generate image data (or depth data) by using the digital signal. The analog-to-digital converter 124 may provide the image data to the output buffer 125. For example, the analog-to-digital converter 124 may be included or integrated in the analog processing circuit 123. The output buffer 125 may store the image data output from the analog-to-digital converter 124. The output buffer 125 may output the image data to the processor 130.

The timing controller 126 may control the components 121 to 125 of the depth sensor 120. The timing controller 126 may control the light controller 111 under control of the processor 130. For example, the timing controller 126 may control the row driver 122 based on modulation information or phase information of the light signal EL to be output from the light source 112.

In an embodiment, under control of the timing controller 126, the row driver 122 may transmit, to the pixel PX, a first modulation signal (e.g., PGA of FIG. 2), the phase of which is identical to or different from a phase of the light signal EL, and a fourth modulation signal (e.g., PGD of FIG. 2), the phase of which is different from the phase of the first modulation signal PGA. For example, the modulation signals PGA and PGD may have phases that are opposite to each other. The depth sensor 120 may generate first image data by using the first modulation signal PGA, may generate fourth image data by using the fourth modulation signal PGD, and may provide the first and fourth image data to the processor 130.

In an embodiment, under control of the timing controller 126, the row driver 122 may transmit, to the pixel PX, a second modulation signal (e.g., PGB of FIG. 2), the phase of which is identical to or different from the phase of the light signal EL, and a third modulation signal (e.g., PGC of FIG. 2), the phase of which is different from the phase of the second modulation signal PGB. For example, the modulation signals PGB and PGC may have phases that are opposite to each other. The depth sensor 120 may generate second image data by using the second modulation signal PGB, may generate third image data by using the third modulation signal PGC, and may provide the second and third image data to the processor 130.

In an embodiment, the first modulation signal PGA and the fourth modulation signal PGD may be associated with shorter exposure, and the second modulation signal PGB and the third modulation signal PGC may be associated with longer exposure. Alternatively, the first modulation signal PGA and the fourth modulation signal PGD may be associated with longer exposure, and the second modulation signal PGB and the third modulation signal PGC may be associated with shorter exposure. In other words, the modulation signals may include at least two pairs of modulation signals, the at least two pairs being associated with different exposure times. As a result, image pairs may be associated with exposure times different from each other.

The processor 130 may control the camera 110. The processor 130 may control the light controller 111 and the light source 112 such that the light signal EL is output. The processor 130 may allow the depth sensor 120 to sense the light signal RL and to generate the first to fourth image data based on the light signal RL. The processor 130 may calculate a distance (for example, a TOF value) between the electronic device 100 and an object, a shape of the object, a movement speed of the object, etc. based on the first image data to the fourth image data. For example, the processor 130 may calculate a delay time of the light signal RL to the light signal EL based on image data generated by the depth sensor 120 by using two or more modulation signals being identical to or different from a phase difference with the light signal EL.

The processor 130 may include an image signal processor (ISP) (not illustrated) for processing image data provided from the depth sensor 120. Alternatively, at least a function(s) of the processor 130 may be implemented at an external device (e.g., a host device (not illustrated)). For example, the processor 130 may be implemented to be independent of the camera 110 as illustrated in FIG. 1. For another example, the processor 130 may be integrated in the camera 110 or the depth sensor 120.

Referring back to FIG. 2, the pixel PX may include a photoelectric conversion device PCD, taps TAP1 to TAP4, and an overflow transistor OF. For example, the photoelectric conversion device PCD may be implemented with a photo diode, a photo transistor, a photo gate, a pinned photo diode, or any combination thereof. Below, the description will be given using an example in which the photoelectric conversion device PCD is a photo diode.

The photoelectric conversion device PCD may generate and integrate charges corresponding to a light signal (e.g., RL of FIG. 1). Charges generated by the photoelectric conversion device PCD may be distributed into photo transistors PA to PD. The amounts of charges distributed and stored by the photo transistors PA to PD may be determined depending on phase differences between photo gate signals PGA to PGD and the light signal EL. For example, the photoelectric conversion device PCD may be implemented in a substrate, in which the pixel array 121 is implemented, so as to overlap the photo transistors PA to PD in a plan view. Referring to FIG. 2, the photoelectric conversion device PCD may be connected between first ends of the photo transistors PA to PD and a ground voltage. The photoelectric conversion device PCD may be shared by a plurality of taps (e.g., TAP1 to TAP4) in one pixel PX.

The tap TAP1 may include the photo transistor PA, a transfer transistor TA, a storage transistor S1, a transfer transistor T1, a floating diffusion region (or referred to as a "floating diffusion node") FD1, a reset transistor R1, a source follower transistor SF1, and a select transistor SE1. The first end (e.g., a drain or a source) of the photo transistor PA may be connected with a first end of the photoelectric conversion device PCD and may be connected with a first end of the overflow transistor OF. The photo transistor PA may integrate charges based on the photo gate signal PGA. The photo gate signal PGA may be a modulation signal, the phase of which is identical to or different from a phase of the light signal EL (refer to FIG. 1). The photo gate signal PGA may be activated (or enabled) during an integration period (or interval) in which the light signal EL is emitted from the light source 112 and the light signal RL is incident onto the pixel array 121 and may be deactivated (or disabled) in the remaining time other than the integration period.

The transfer transistor TA may be connected between a second end of the photo transistor PA and a first end of the storage transistor S1. The transfer transistor TA may electrically connect the second end of the photo transistor PA and the first end of the storage transistor S1 during the integration period based on a transfer gate signal TGA and thus may transfer the charges integrated by the photo transistor PA to the storage transistor S1. In the time except for the integration period, the transfer transistor TA may prevent charges integrated by the photo transistor PA from being transferred to the storage transistor S1 based on the transfer gate signal TGA.

The storage transistor S1 may be connected between the transfer transistors TA and T1 and may store charges integrated by the photo transistor PA based on a storage gate signal SG1. For example, the charges integrated by the photo transistor PA may not be immediately transferred to the floating diffusion region FD1.

The transfer transistor T1 may be connected between a second end of the storage transistor S1 and the floating diffusion region FD1. The transfer transistor T1 may transfer the charges stored by the storage transistor S1 to the floating diffusion region FD1 based on a transfer gate signal TG1.

The reset transistor R1 may be connected between the floating diffusion region FD1 and a power supply voltage VDD. The reset transistor R1 may electrically connect the floating diffusion region FD1 and the power supply voltage VDD based on a reset gate signal RG1. The reset transistor R1 may drive a voltage level of the floating diffusion region FD1 to the power supply voltage VDD based on the reset gate signal RG1 and thus may discharge charges stored in the floating diffusion region FD1. The source follower transistor SF1 may be connected between the power supply voltage VDD and the select transistor SE1. A gate terminal of the source follower transistor SF1 may be connected with the floating diffusion region FD1. The source follower transistor SF1 may output an output signal OUT1 based on a voltage level of the floating diffusion region FD1. The select transistor SE1 may be connected between the source follower transistor SF1 and an output line (not illustrated). The select transistor SE1 may output the output signal OUT1 to the output line based on a selection signal SEL1. The transistors R1, SE1, and SF1 may constitute a readout circuit.

Configurations and operations of the taps TAP2 to TAP4 may be similar to those of the tap TAP1 except that photo transistors PB to PD receive photo gate signals PGB to PGD, respectively. For example, the storage transistors S1 and S2 of the taps TAP1 and TAP2 may be simultaneously controlled by the storage gate signal SG1, and the storage transistors S3 and S4 of the taps TAP3 and TAP4 may be simultaneously controlled by the storage gate signal SG2. The transfer transistors T1 and T2 of the taps TAP1 and TAP2 may be simultaneously controlled by the transfer gate signal TG1, and the transfer transistors T3 and T4 of the taps TAP3 and TAP4 may be simultaneously controlled by the transfer gate signal TG2. The select transistors SE1 and SE2 of the taps TAP1 and TAP2 may be simultaneously controlled by the selection signal SEL1, and the select transistors SE3 and SE4 of the taps TAP3 and TAP4 may be simultaneously controlled by the selection signal SEL2. The reset transistors R1 and R2 of the taps TAP1 and TAP2 may be simultaneously controlled by the reset gate signal RG1, and the reset transistors R3 and R4 of the taps TAP3 and TAP4 may be simultaneously controlled by the reset gate signal RG2.

The photo gate signals PGA to PGD may be activated during the integration period and may be deactivated in the remaining time other than the integration period. In an embodiment, an interval in which the photo gate signals PGB and PGC are activated may be different from an interval in which the photo gate signal PGA is activated. The photo gate signals PGA and PGD may be activated in the same interval. In an embodiment, a length of an interval in which the photo gate signals PGA and PGD are activated may be different from a length of an interval in which the photo gate signals PGB and PGC are activated. That is, the photo gate signals PGA and PGD may be associated with a shorter exposure, and the photo gate signals PGB and PGC may be associated with a longer exposure (or vice versa).

The taps TAP1 to TAP4 may output signals OUT1 to OUT4 based on the photo gate signals PGA to PGD. For example, a voltage level difference between the output signals OUT1 to OUT4 may be associated with a distance between the electronic device 100 and an object.

The overflow transistor OF may be connected with the power supply voltage VDD. Due to an external light in the time other than the integration period, the photoelectric conversion device PCD or the photo transistors PA to PD may integrate charges. The overflow transistor OF may be turned on based on an overflow gate signal OG in the time other than the integration period. As a result, as the power supply voltage VDD is applied, charges integrated by the photoelectric conversion device PCD or the photo transistors PA to PD may be discharged. Although one overflow transistor OF is illustrated in FIG. 2, a plurality of overflow transistors (e.g., four) may be provided depending on embodiments.

A reset transistor, a source follower transistor, and a select transistor may also be referred to as a "readout circuit". For example, the tap TAP1 may include a readout circuit, which includes the reset transistor R1, the source follower transistor SF1, and the select transistor SE1, and may include the photo transistor PA, the transfer transistor TA, the storage transistor S1, and the transfer transistor T1. Configurations of the remaining taps TAP2 to TAP4 may also be similar to that of the tap TAP1.

An embodiment is illustrated in FIG. 2 in which all transistors of the pixel PX are implemented with NMOS transistors; however, a kind of transistors included in the pixel PX is not limited to an example illustrated in FIG. 2. For example, the transistors of the pixel PX may be implemented with PMOS transistors or a combination of PMOS transistors and NMOS transistors.

Figure 3:
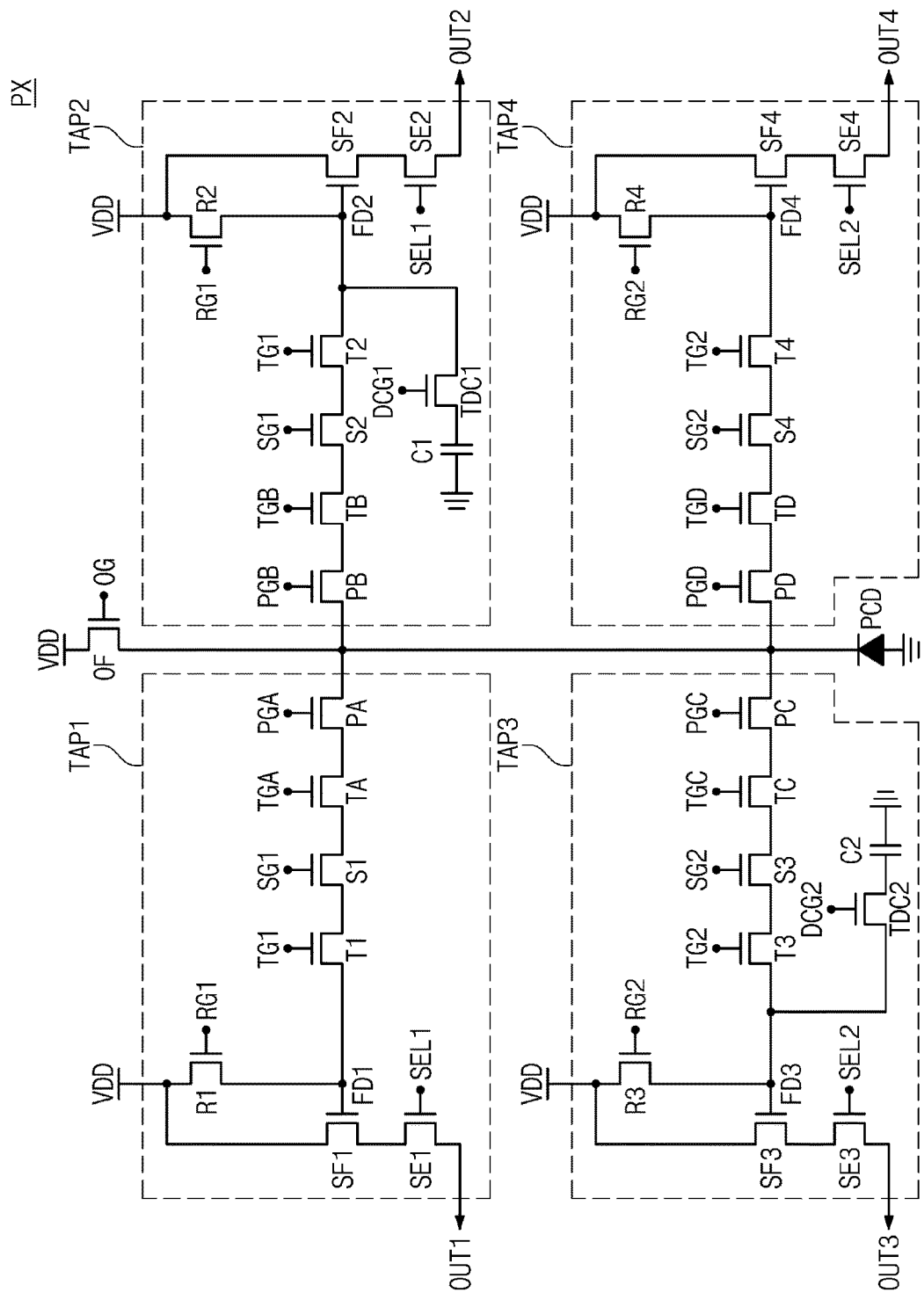
FIG. 3 is an example of a circuit diagram of a pixel of FIG. 1.

FIG. 3 is an example of a circuit diagram of a pixel of FIG. 1. The circuit diagram of FIG. 3 is similar to the circuit diagram of FIG. 2. Below, a difference will be mainly described.

As described above in the embodiment of FIG. 2, because the photo gate signals PGA and PGD are associated with a shorter exposure, an interval in which the photo gate signals PGA and PGD are activated may be shorter. Accordingly, under a general environment, because the floating diffusion regions FD1 and FD4 are not easily saturated, there is no need to increase capacitances of the floating diffusion regions FD1 and FD4. However, because the photo gate signals PGB and PGC are associated with a longer exposure, an interval in which the photo gate signals PGB and PGC are activated may be longer. Accordingly, the floating diffusion regions FD2 and FD3 are easily saturated when a distance between an electronic device and an object is close, and thus, there is a need to increase capacitances of the floating diffusion regions FD2 and FD3.

In an embodiment, to prevent the saturation of the floating diffusion regions FD2 and FD3, capacitors C1 and C2 may be further provided. For example, the tap TAP2 may include the capacitor C1 and a dual conversion gain transistor TDC1, and the tap TAP3 may include the capacitor C2 and a dual conversion gain transistor TDC2. When the dual conversion gain transistor TDC1 is turned on by a control signal DCG1, the floating diffusion region FD2 may be electrically connected with the capacitor C1, and thus a capacitance of the floating diffusion region FD2 may be increased. When the dual conversion gain transistor TDC2 is turned on by a control signal DCG2, the floating diffusion region FD3 may be electrically connected with the capacitor C2, and thus a capacitance of the floating diffusion region FD3 may be increased.

Alternatively, unlike the description given with reference to FIG. 3, capacitances of the floating diffusion regions FD2 and FD3 may be increased by controlling a gate voltage of a transistor, without using separate capacitors. For example, the amount of charges that the storage transistors S2 and S3 store may be increased by increasing voltage levels of the storage gate signals SG1 and SG2 that are applied to gate electrodes of the storage transistors S2 and S3, respectively.

Figure 4:
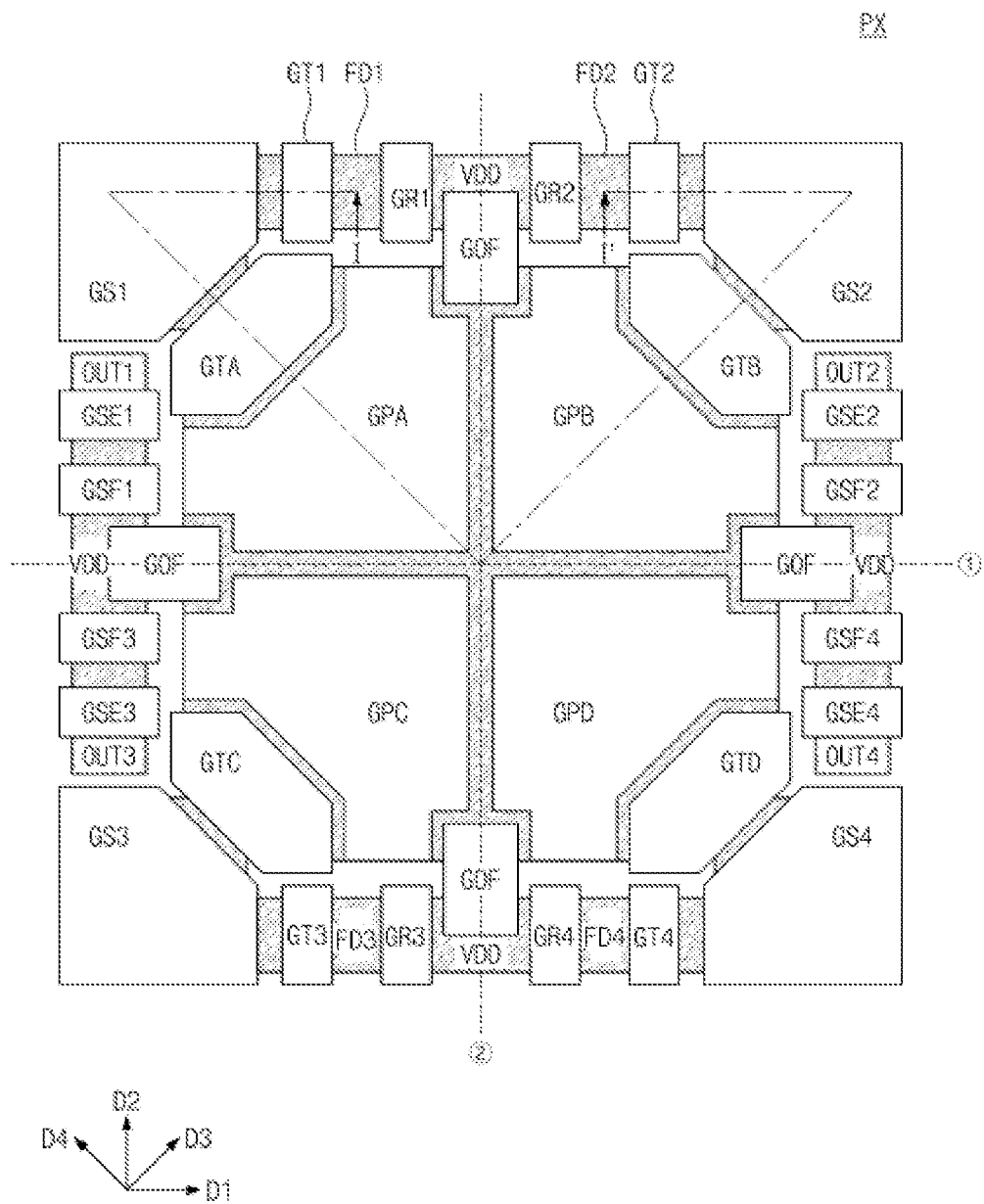
FIG. 4 illustrates an example of a layout of a pixel of FIG. 2.

FIG. 4 illustrates an example of a layout of a pixel of FIG. 2. In the following drawings including FIG. 4, a direction D1 and a direction D2 may be perpendicular to each other. The directions D1 and D2 may be perpendicular to a direction that faces the pixel array 121 in a plan view. For example, the directions D1 and D2 may respectively correspond to the row and column directions in which the pixels PX of the pixel array 121 are arranged. For another example, the directions D1 and D2 may respectively correspond to the column and row directions in which the pixels PX of the pixel array 121 are arranged. A direction D3 may indicate a direction between the directions D1 and D2, and a fourth direction D4 may be perpendicular to the direction D3. Each of the directions D3 and D4 may be perpendicular to the direction that faces the pixel array 121 in a plan view.

Drains or sources of the transistors PA to PD, TA to TD, S1 to S4, T1 to T4, R1 to R4, SF1 to SF4, and SE1 to SE4, and the floating diffusion regions FD1 to FD4 may be formed or disposed in shaded regions of FIG. 4. Gate electrodes of the transistors PA to PD, TA to TD, S1 to S4, T1 to T4, R1 to R4, SF1 to SF4, and SE1 to SE4 may be disposed in regions between the shaded regions of FIG. 4.

A region of the pixel PX may be divided into a central region including a center of the pixel PX and a boundary region adjacent to another pixel. Gate electrodes GPA to GPD of the photo transistors PA to PD may be disposed adjacent to each other in the central region. Gate electrodes GTA to GTD of the transfer transistors TA to TD may be respectively disposed adjacent to the gate electrodes GPA to GPD along the direction D3 or the direction D4. Gate electrodes GS1 to GS4 of the storage transistors S1 to S4 may be respectively disposed adjacent to the gate electrodes GTA to GTD along the direction D3 or the direction D4. Gate electrodes GT1 to GT4 of the transfer transistors T1 to T4 may be respectively interposed between the gate electrodes GS1 to GS4 and the floating diffusion regions FD1 to FD4 along the direction D1. Gate electrodes GR1 to GR4 of the reset transistors R1 to R4 may be respectively disposed adjacent to the floating diffusion regions FD1 to FD4 along the direction D1.

Gate electrodes GSF1 to GSF4 of the source follower transistors SF1 to SF4 may be respectively disposed adjacent to the gate electrodes GPA to GPD along the direction D1. Although not illustrated in FIG. 4, metal wires that electrically connect the floating diffusion regions FD1 to FD4 with the gate electrodes GSF1 to GSF4 may be disposed on the pixel PX. Gate electrodes GSE1 to GSE4 of the select transistors SE1 to SE4 may be respectively disposed adjacent to the gate electrodes GSF1 to GSF4 along the direction D2.

An imaginary line ① may be parallel to the direction D1, and an imaginary line ② may be parallel to the direction D2. A cross point of the imaginary lines ① and ② may be the center of the pixel PX in a plan view. The region of the pixel PX may be divided into quadrants, each of which is bounded by the imaginary lines ① and ②. The taps TAP1 to TAP4 of the pixel PX may be respectively disposed in the quadrants. For example, the taps TAP1 and TAP2 may be symmetric with respect to the imaginary line ②, and the taps TAP3 and TAP4 may be symmetric with respect to the imaginary line ②. The taps TAP1 and TAP3 may be symmetric with respect to the imaginary line ①, and the taps TAP2 and TAP4 may be symmetric with respect to the imaginary line ①. The taps TAP1 and TAP4 may be symmetric with respect to the center of the pixel PX, and the taps TAP2 and TAP3 may be symmetric with respect to the center of the pixel PX.

Figure 5:
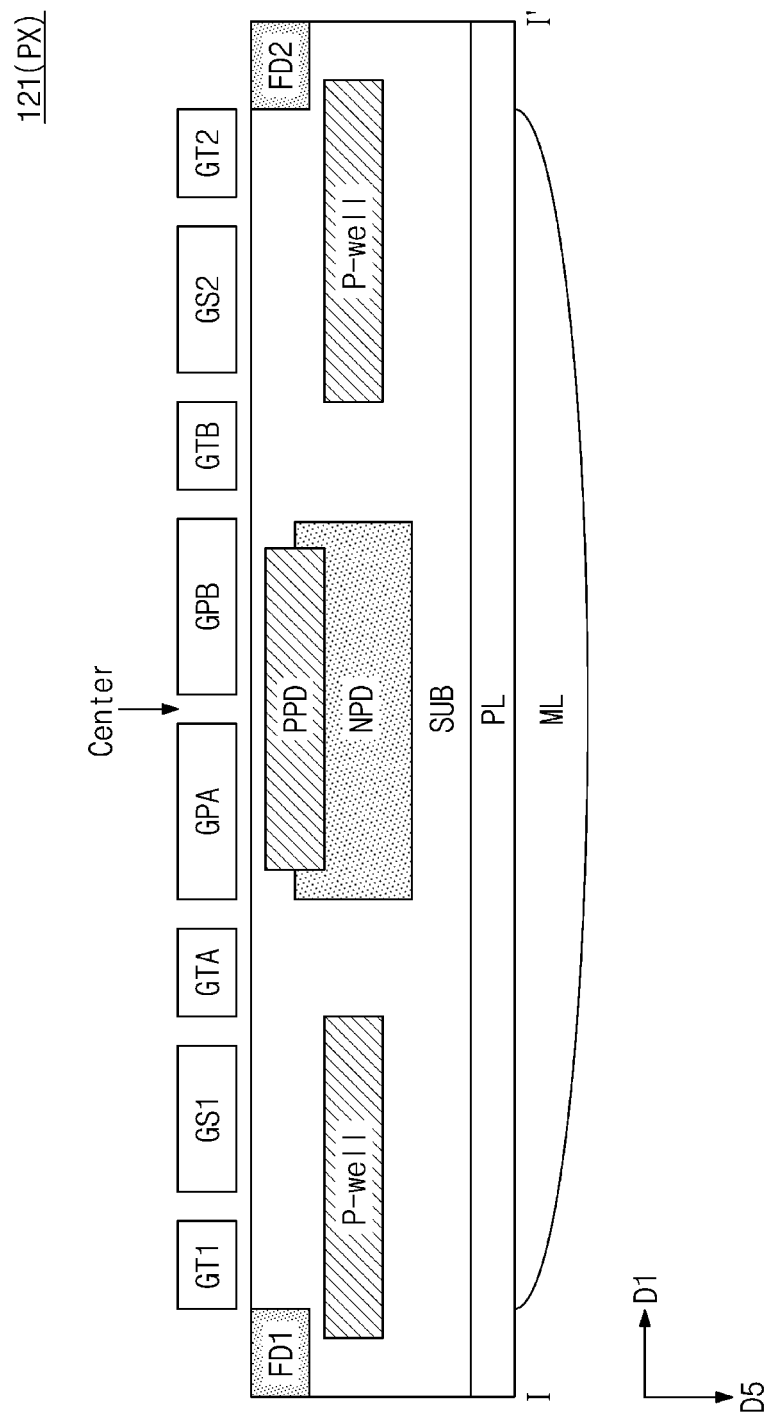
FIG. 5 illustrates an example of a cross-sectional view of a pixel PX taken along line I-I' of FIG. 4.

FIG. 5 illustrates an example of a cross-sectional view of the pixel PX taken along line I-I' of FIG. 4. A direction D5 may correspond to a direction that faces the pixel array 121 including the pixel PX in a plan view. The pixel array 121 may be implemented on a substrate SUB. For example, the substrate SUB may be a P-type epitaxial layer. A planarization layer PL may be formed on the substrate SUB along the direction D5. For example, the planarization layer PL may be a transparent layer. A micro lens layer including a plurality of micro lenses ML may be formed on the planarization layer PL along the direction D5. The micro lens layer may condense the light signal RL incident onto a back side of the substrate SUB and may provide the light signal RL to the substrate SUB. For example, the pixel array 121 may be implemented in a back side illumination (BSI) structure in which a light signal is received through the back side. Referring to FIG. 5, in a plan view, the center of one micro lens ML and the center of one pixel PX may be aligned with each other. The gate electrodes GT1, GS1, GTA, GPA, GPB, GTB, GS2, and GT2 may be formed on the substrate SUB along the direction D1.

The substrate SUB may include a light detecting region in which the photoelectric conversion device PCD is implemented. For example, the light detecting region may include an N-type photo diode (NPD) being an N-type impurity region and a P-type photo diode (PPD) being a P-type impurity region. The photoelectric conversion device PCD of the light detecting region may integrate charges based on voltage levels of the photo gate signals PGA and PGB respectively applied to the gate electrodes GPA and GPB and may transfer the charges to the storage transistors S1 and S2. For example, the photoelectric conversion device PCD may overlap the photo transistors PA and PB in a plan view.

The substrate SUB may include P-well regions disposed between the photoelectric conversion device PCD and the floating diffusion regions FD1 and FD2 in a plan view. The P-well regions may operate as a barrier that prevents charges from being directly transferred to the storage transistors S1 and S2 or the floating diffusion regions FD1 and FD2. For example, the P-well regions may overlap the storage transistors S1 and S2 or the floating diffusion regions FD1 and FD2 in a plan view. The substrate SUB may further include the floating diffusion regions FD1 and FD2. For example, the floating diffusion regions FD1 and FD2 may be n-type impurity regions.

Figure 6A:
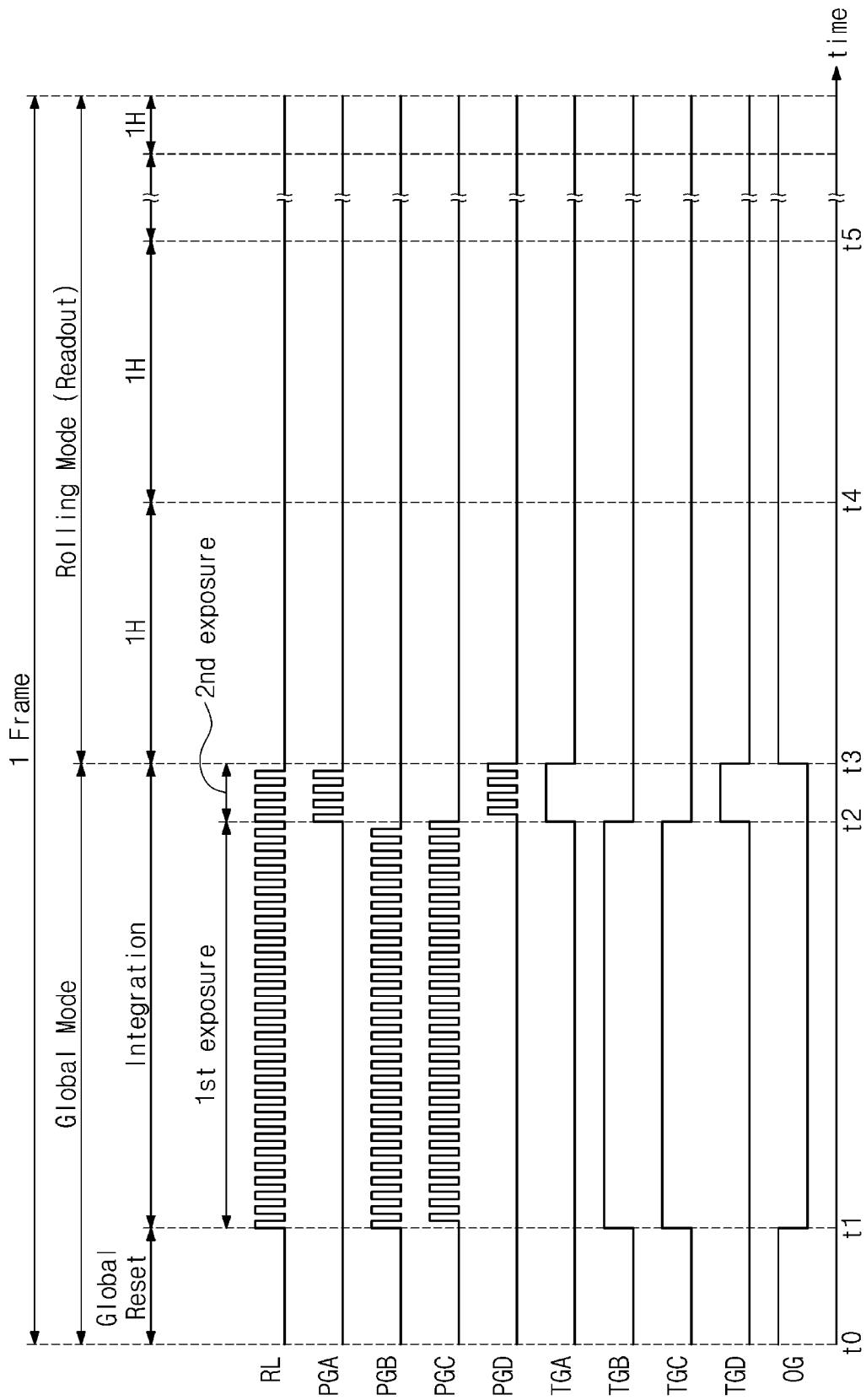
FIGS. 6A and 6B illustrate examples of timing diagrams of signals that are applied to a pixel of FIG. 2.
Figure 6B:
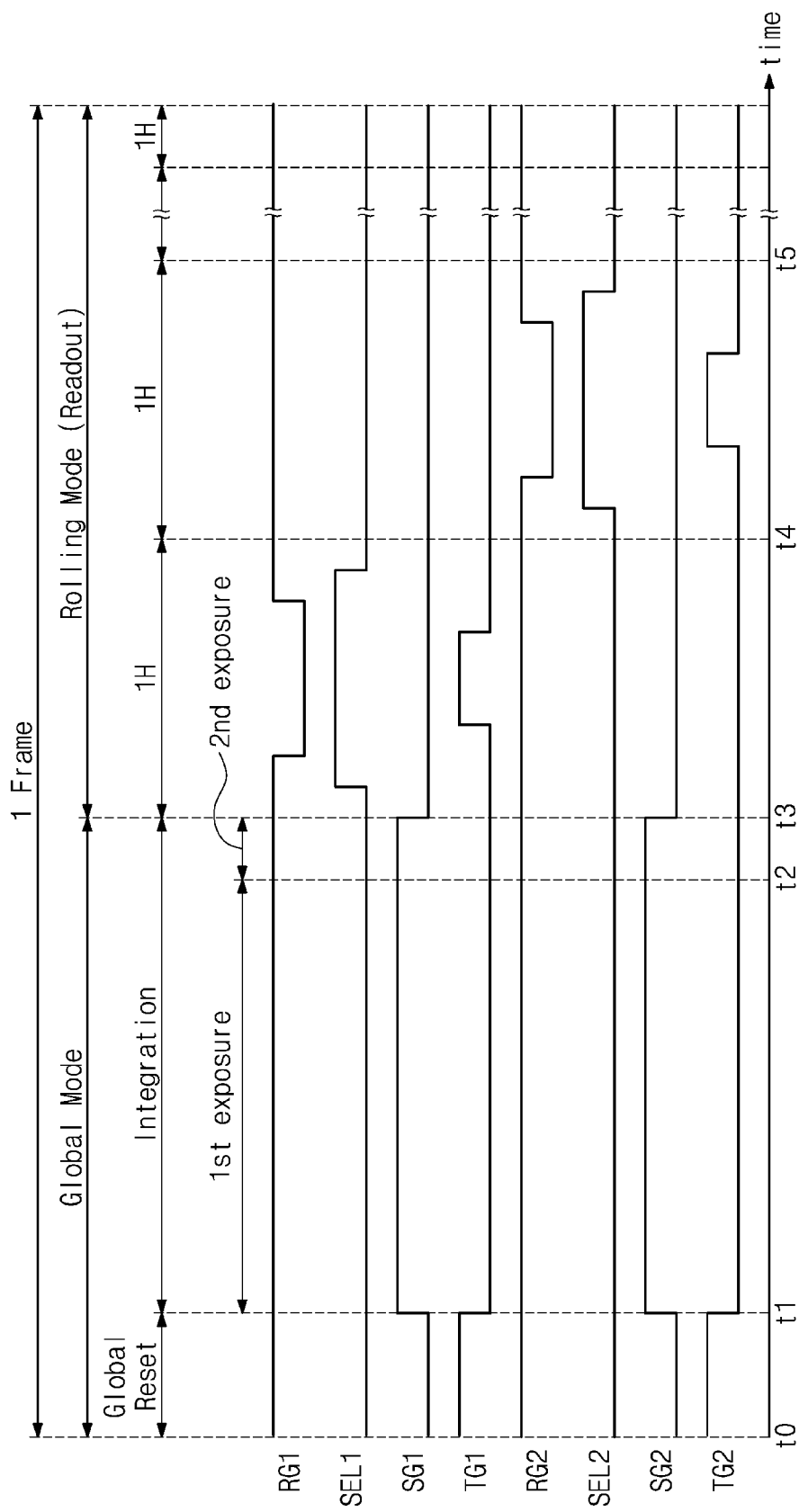

FIGS. 6A and 6B illustrate examples of timing diagrams of signals that are applied to a pixel of FIG. 2.

The timing diagrams of the signals of FIGS. 6A and 6B may indicate a period for reading out one frame and may be repeated. A period for reading out one frame may be divided into an interval of the global mode in which all the pixels PX of the pixel array 121 operate at the same time and an interval of the rolling mode in which the pixels PX operate in units of row.

A global reset period of the global mode may include an interval from t0 to t1. During the global reset period, all the pixels PX of the pixel array 121 may be reset. As the overflow transistor OF is turned on by the activated overflow gate signal OG, the power supply voltage VDD may be supplied to the photo transistors PA to PD. As a result, charges integrated by the photo transistors PA to PD may be removed. The transfer gate signals TGA to TGD may be deactivated, and thus the transfer transistors TA to TD may prevent charges from being transferred from the photo transistors PA to PD to the floating diffusion regions FD1 to FD4.

An integration period of the global mode may include an interval from t1 to t3. In detail, the integration period may include a first integration period t1 to t2 and a second integration period t2 to t3, and the first integration period t1 to t2 may be longer than the second integration period t2 to t3. The photo transistors PA to PD may integrate charges based on the photo gate signals PGA to PGD. The overflow gate signal OG may be deactivated such that integrated charges are prevented from being removed by the power supply voltage VDD.

During the first integration period t1 to t2, charges associated with the longer exposure may be integrated. The photo gate signals PGB and PGC may be activated, and thus charges may be integrated by the photo transistors PB and PC of the taps TAP2 and TAP3. The transfer gate signals TGB and TGC may be activated, and thus the charges integrated by the photo transistors PB and PC may be respectively transferred to the floating diffusion regions FD2 and FD3 through the transfer transistors TB and TC.

During the second integration period t2 to t3, charges associated with the shorter exposure may be integrated. The photo gate signals PGA and PGD may be activated, and thus charges may be integrated by the photo transistors PA and PD of the taps TAP1 and TAP4. The transfer gate signals TGA and TGD may be activated, and thus the charges integrated by the photo transistors PA and PD may be respectively transferred to the floating diffusion regions FD1 and FD4 through the transfer transistors TA and TD.

A readout period of the rolling mode may include into a plurality of 1H intervals. The IH interval may indicate a readout time for taps that are controlled by the same selection signal (e.g., SEL1 or SEL2). The first 1H interval may include an interval from t3 to t4, and the second 1H interval may include an interval from t4 to t5. For example, the first 1H interval t3 to t4 may be associated with a readout operation for the taps TAP1 and TAP2, and the second 1H interval t4 to t5 may be associated with a readout operation for the taps TAP3 and TAP4. During the interval from t3 to t4 and the interval from t4 to t5, to block the introduction of additional charges due to an external light or dark current, the photo gate signals PGA to PGD, the transfer gate signals TGA to TGD, and the storage gate signals SG1 and SG2 may be deactivated to low (i.e., a low level), and the overflow gate signal OG may be activated (i.e., to a high level).

In another example embodiment, the storage gate signals SG1 to SG4 may be maintained at an active state to increase storage capacities of the storage transistors S1 and S2. However, when charges are transferred to the floating diffusion regions FD1 to FD4, the corresponding storage transistor may be changed to an inactive state.

In the first 1H interval t3 to t4, when the transfer gate signal TG1 has the high level, charges stored by the storage transistors S1 and S2 may be respectively transferred to the floating diffusion regions FD1 and FD2. In this case, the reset gate signal RG1 may be in a low-level state. The output signals OUT1 and OUT2 corresponding to potentials of charges stored in the floating diffusion regions FD1 and FD2 may be output to the analog processing circuit 123 (refer to FIG. 1) through the select transistors SE1 and SE2 turned on by the selection signal SEL1, respectively.

In the second 1H interval t4 to t5, when the transfer gate signal TG2 has the high level, charges stored by the storage transistors S3 and S4 may be respectively transferred to the floating diffusion regions FD3 and FD4. In this case, the reset gate signal RG2 may be in a low-level state. The output signals OUT3 and OUT4 corresponding to potentials of charges stored in the floating diffusion regions FD3 and FD4 may be output to the analog processing circuit 123 (refer to FIG. 1) through the select transistors SE3 and SE4 turned on by the selection signal SEL2, respectively.

In an embodiment, output signals (e.g., OUT1 and OUT4 of FIG. 2) associated with the shorter exposure may be utilized to sense a short-range object or a longer-range object, and output signals (e.g., OUT2 and OUT3 of FIG. 2) associated with the longer exposure may be utilized to sense a longer-range object.

In the embodiment of FIG. 6A, it is described that the readout operation for the taps TAP1 and TAP2 is performed in the first 1H interval and the readout operation for the taps TAP3 and TAP4 is performed in the second 1H interval; however, the disclosure is not limited thereto. For example, in another embodiment, the readout operation for the taps TAP3 and TAP4 may be performed in the first 1H interval, and the readout operation for the taps TAP1 and TAP2 may be performed in the second 1H interval.

According to the example embodiments described above, as the longer exposure and the shorter exposure are performed through only one readout operation, a ToF read speed may be improved. In addition, when two or more readout operations are performed, the shuffle may be performed by using readout results for the longer exposure and readout results for the shorter exposure, and thus the quality of a depth map may be improved.

Figure 7:
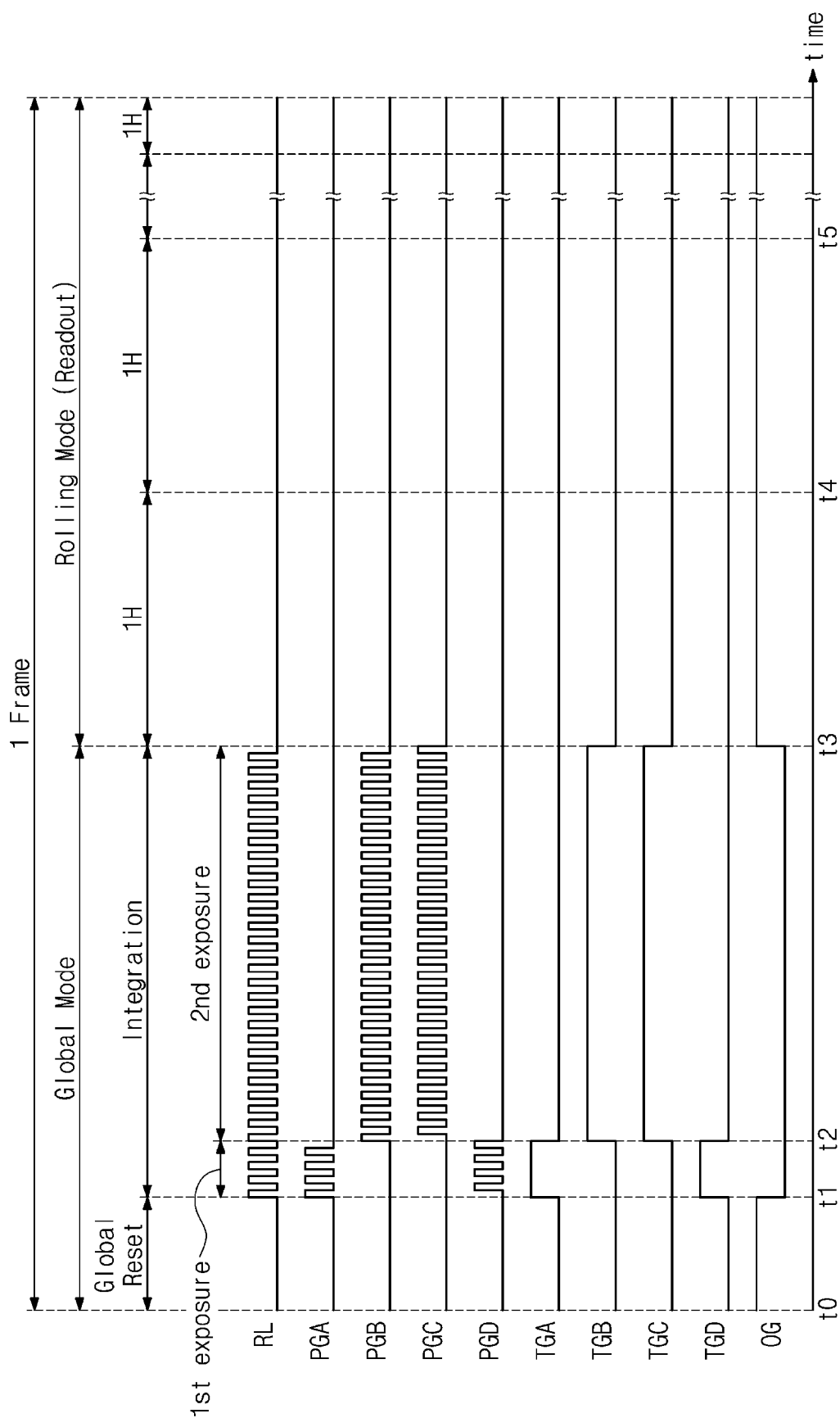
FIG. 7 illustrates an example of a timing diagram of signals that are applied to a pixel of FIG. 2.

FIG. 7 illustrates an example of a timing diagram of signals that are applied to a pixel of FIG. 2. The timing diagram of FIG. 7 is similar to the timing diagram of FIG. 6A, and thus, additional description will be omitted to avoid redundancy.

During a first integration period t1 to t2, charges associated with the shorter exposure may be integrated. The photo gate signals PGA and PGD may be activated, and thus charges may be integrated by the photo transistors PA and PD of the taps TAP1 and TAP4. The transfer gate signals TGA and TGD may be activated, and thus the charges integrated by the photo transistors PA and PD may be respectively transferred to the floating diffusion regions FD1 and FD4 through the transfer transistors TA and TD.

During a second integration period t2 to t3, charges associated with the longer exposure may be integrated. The photo gate signals PGB and PGC may be activated, and thus charges may be integrated by the photo transistors PB and PC of the taps TAP2 and TAP3. The transfer gate signals TGB and TGC may be activated, and thus the charges integrated by the photo transistors PB and PC may be respectively transferred to the floating diffusion regions FD2 and FD3 through the transfer transistors TB and TC.

Afterwards, during the first 1H interval t3 to t4, a readout operation for the taps TAP1 and TAP4 may be performed; during the second 1H interval t4 to t5, a readout operation for the taps TAP2 and TAP3 may be performed.

According to the embodiments described above, because a readout operation corresponding to the shorter exposure and a readout operation corresponding to the longer exposure are performed in one integration period t1 to t3, there may be a need to perform a reset operation on pixels at a time (i.e., t2) at which attributes of charge integration change.

Figure 8A:
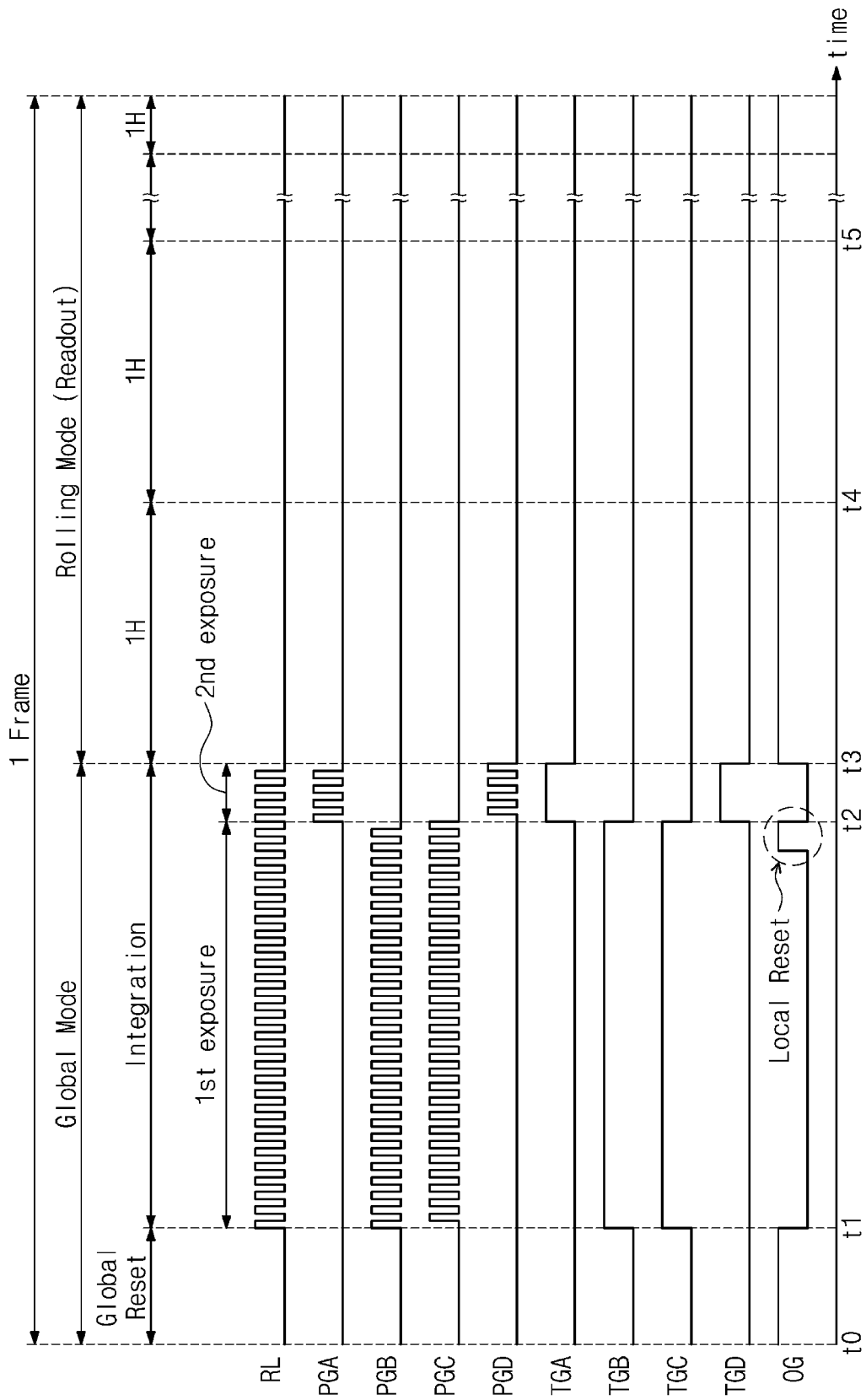
FIGS. 8A and 8B illustrate examples of timing diagrams of signals that are applied to a pixel of FIG. 2.
Figure 8B:
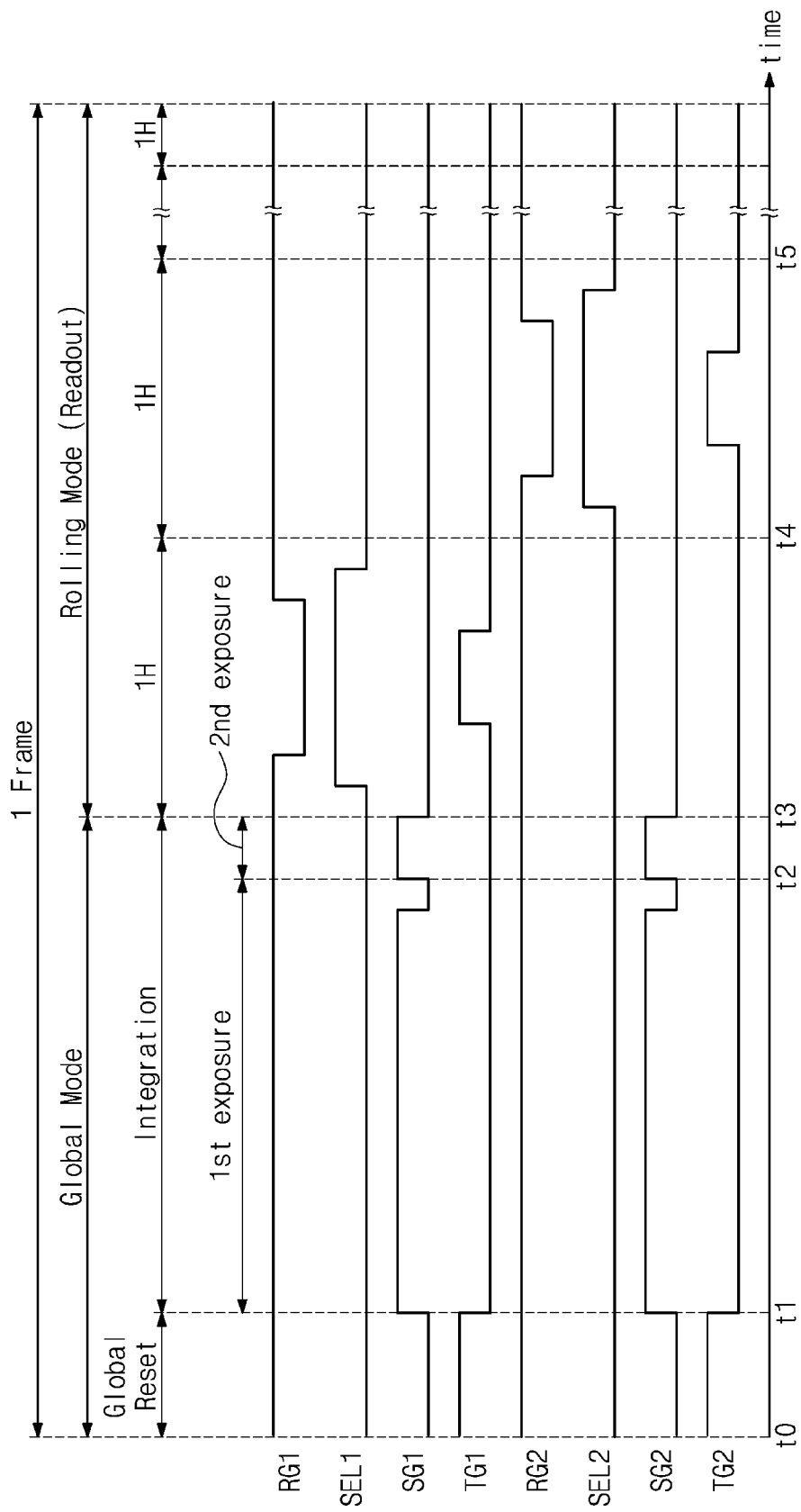

FIGS. 8A and 8B illustrate examples of timing diagrams of signals that are applied to a pixel of FIG. 2. The timing diagram of FIG. 8A is similar to the timing diagram of FIG. 6A, and thus, additional description will be omitted to avoid redundancy.

Referring to FIGS. 2, 8A, and 8B, the overflow gate signal OG is activated immediately before time t2, and charges that remain at the photoelectric conversion device PCD or the photo transistors PA to PD may be discharged. Attributes of a reset operation that is performed immediately before t2 are similar to a global reset operation that is performed in an interval from t0 to t1, but for convenience, the reset operation that is performed immediately before t2 may be referred to as a "local reset operation". In this case, the storage gate signals SG1 and SG2 may be deactivated to prevent charges from being introduced to the storage transistors S1 and S2.

In another example embodiment, the storage gate signals SG1 and SG2 for controlling the storage transistors S1 and S2 may be deactivated to a logic low state in an interval in which charges are transferred to the floating diffusion regions FD1 to FD4 and a reset interval and may be activated to a logic high state in the remaining intervals.

Figure 10:
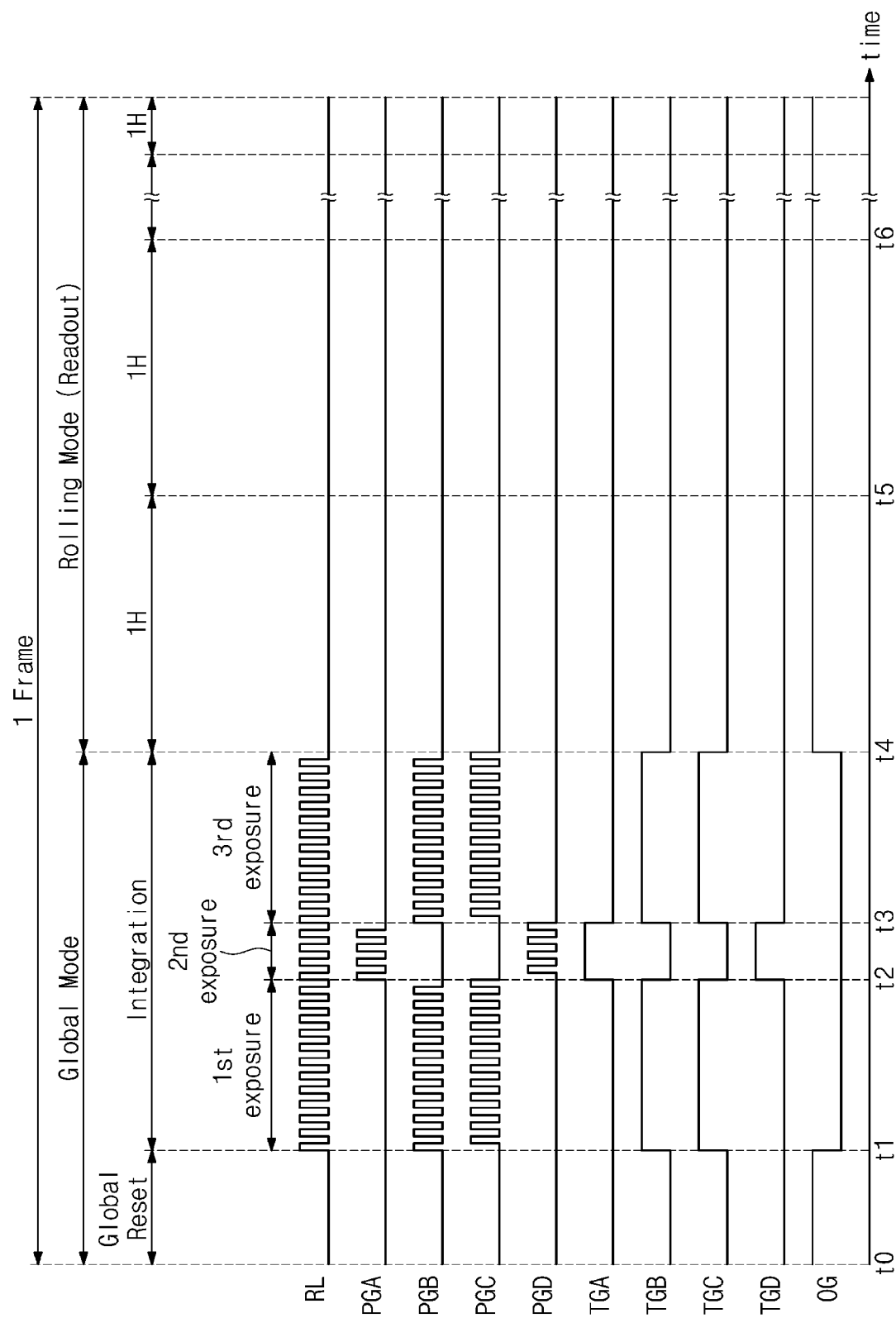
Figure 11:
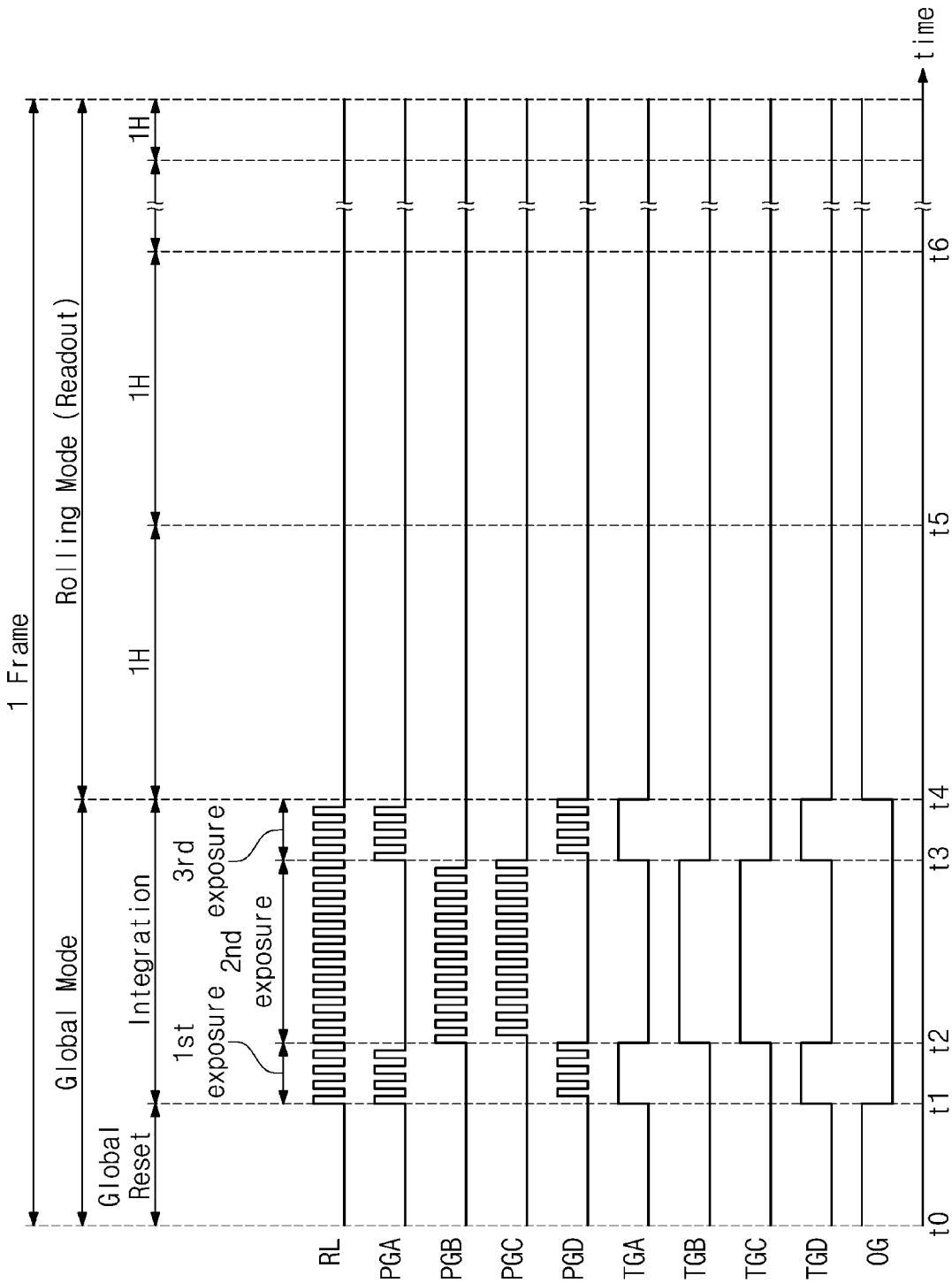

FIGS. 9 to 11 are examples of timing diagrams of signals that are applied to a pixel of FIG. 2.

In the above embodiments, it is described that one shorter exposure and one longer exposure are performed during one integration period. Unlike the above embodiments, in the embodiment of FIG. 9, two or more shorter exposures and two or more longer exposures may be performed during an integration period t1 to t5.

During a first integration period t1 to t2, charges associated with the longer exposure may be integrated. The photo gate signals PGB and PGC may be activated, and thus charges may be integrated by the photo transistors PB and PC of the taps TAP2 and TAP3. The transfer gate signals TGB and TGC may be activated, and thus the charges integrated by the photo transistors PB and PC may be respectively transferred to the floating diffusion regions FD2 and FD3 through the transfer transistors TB and TC.

During a second integration period t2 to t3, charges associated with the shorter exposure may be integrated. The photo gate signals PGA and PGD may be activated, and thus charges may be integrated by the photo transistors PA and PD of the taps TAP1 and TAP4. The transfer gate signals TGA and TGD may be activated, and thus the charges integrated by the photo transistors PA and PD may be respectively transferred to the floating diffusion regions FD1 and FD4 through the transfer transistors TA and TD.

During a third integration period t3 to t4, charges associated with the longer exposure may be integrated. The photo gate signals PGB and PGC may be activated, and thus charges may be integrated by the photo transistors PB and PC of the taps TAP2 and TAP3. The transfer gate signals TGB and TGC may be activated, and thus the charges integrated by the photo transistors PB and PC may be respectively transferred to the floating diffusion regions FD2 and FD3 through the transfer transistors TB and TC.

During a fourth integration period t4 to t5, charges associated with the shorter exposure may be integrated. The photo gate signals PGA and PGD may be activated, and thus charges may be integrated by the photo transistors PA and PD of the taps TAP1 and TAP4. The transfer gate signals TGA and TGD may be activated, and thus the charges integrated by the photo transistors PA and PD may be respectively transferred to the floating diffusion regions FD1 and FD4 through the transfer transistors TA and TD.

In the embodiments described with reference to FIGS. 6A to 8B, the quality of a depth map may be degraded due to a motion blur in a specific situation. For example, in the case where an interval in which an object momently moves quickly has a biased tendency of occurrence in a specific exposure interval (i.e., one of the shorter exposure and the longer exposure), the motion blur may occur in the corresponding exposure interval. However, according to the embodiment of FIG. 9, each of the shorter exposure and the longer exposure may be performed at least two times, and thus an interval in which an object momently moves quickly may be prevented from having a biased tendency of occurrence in a specific exposure interval. Accordingly, the degradation of the quality of the depth due to the motion blur map may be improved.

In an embodiment, the iteration of the shorter exposure and the longer exposure is not limited to the example of FIG. 9. For example, each of the shorter exposure and the longer exposure may be performed three times or more. In this case, the shorter exposure and the longer exposure may be alternately performed.

In addition, in an embodiment, only one of the shorter exposure and the longer exposure may be performed at least two times. For example, as illustrated in FIG. 10, the longer exposure may be first performed, and the shorter exposure and the longer exposure may then be performed. Alternatively, as illustrated in FIG. 11, the shorter exposure may be first performed, and the longer exposure and the shorter exposure may then be performed.

Figure 12:
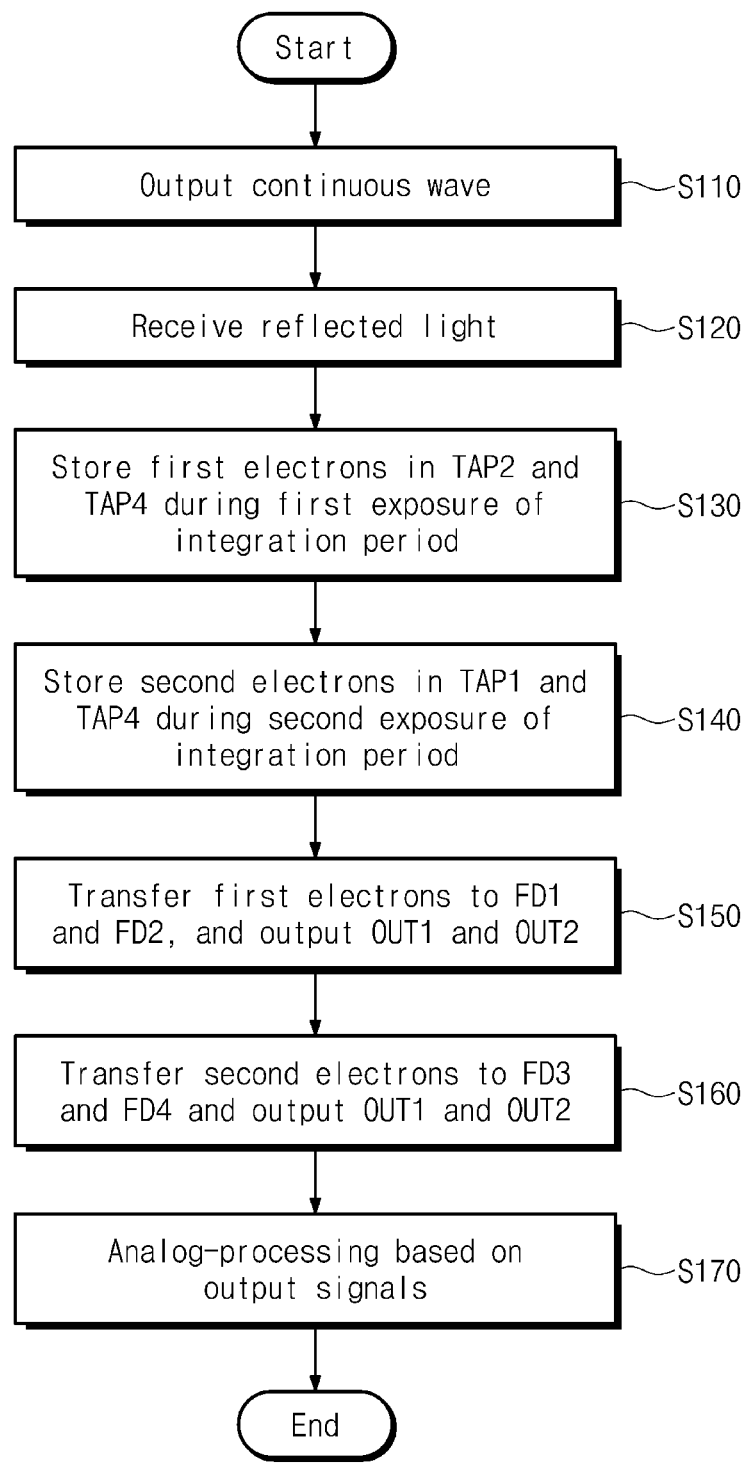
FIG. 12 is a flowchart illustrating an operating method of an electronic device according to an example embodiment.

FIG. 12 is a flowchart illustrating an operating method of an electronic device according to an example embodiment. An operating method of an electronic device will be described with reference to FIG. 12 together with FIGS. 1, 2, 3, 6A, and 6B.

The light source 112 of the camera 110 may emit the light signal EL modulated by the light controller 111 to an object (S110). For example, the light signal EL may be, but is not limited to, a continuous wave. The depth sensor 120 of the camera 110 may receive the light signal RL reflected by the object (S120). The depth sensor 120 of the camera 110 may sense a distance between the camera 110 and the object based on the light signal RL.

The pixel array 121 of the depth sensor 120 may store charges corresponding to the light signal RL. To this end, the pixel array 121 may have, in detail, a 4-tap structure. For example, the taps TAP1 and TAP2 may be disposed at the same row and may be controlled by the same selection signal (e.g., SEL1), and the taps TAP3 and TAP4 may be disposed at the same row and may be controlled by the same selection signal (e.g., SEL2). For example, the taps TAP2 and TAP3 may process charges integrated during a first integration period, and the taps TAP1 and TAP4 may process charges integrated during a second integration period. The first integration period may be longer than the second integration period, but the disclosure is not limited thereto.

The taps TAP2 and TAP3 may store the charges integrated during the first integration period (S130). For example, the photo transistors PB and PC and the storage transistors S2 and S3 of the taps TAP2 and TAP3 may be activated during the first integration period, and the storage transistors S2 and S3 may store the charges integrated by the photo transistors PB and PC, respectively.

Afterwards, the taps TAP1 and TAP4 may store the charges integrated during the second integration period (S140). For example, the photo transistors PA and PD and the storage transistors S1 and S4 of the taps TAP1 and TAP4 may be activated during the second integration period, and the storage transistors S1 and S4 may store the charges integrated by the photo transistors PA and PD, respectively.

In the rolling mode, readout operations may be performed based on the charges stored by the taps TAP1 to TAP4. For example, in the first 1H interval, the taps TAP1 and TAP2 may be selected by the selection signal SEL1, and charges stored by the storage transistors S1 and S2 of the taps TAP1 and TAP2 may be transferred to the floating diffusion regions FD1 and FD2, respectively, in an interval in which the transfer gate signal TG1 has the high level (S150). The output signals OUT1 and OUT2 corresponding to potentials of charges stored in the floating diffusion regions FD1 and FD2 may be output to the analog processing circuit 123 through the select transistors SE1 and SE2 turned on by the selection signal SEL1, respectively.

Afterwards, in the second 1H interval, the taps TAP3 and TAP4 may be selected by the selection signal SEL2, and charges stored by the storage transistors S3 and S4 of the taps TAP3 and TAP4 may be transferred to the floating diffusion regions FD3 and FD4, respectively, in an interval in which the transfer gate signal TG2 has the high level (S160). The output signals OUT3 and OUT4 corresponding to potentials of charges stored in the floating diffusion regions FD3 and FD4 may be output to the analog processing circuit 123 through the select transistors SE3 and SE4 turned on by the selection signal SEL2, respectively.

In the embodiment of FIG. 12, it is described that charges stored by the storage transistors S1 and S2 of the taps TAP1 and TAP2 are first transferred to the floating diffusion regions FD1 and FD2 and charges stored by the storage transistors S3 and S4 of the taps TAP3 and TAP4 are then transferred to the floating diffusion regions FD3 and FD4, but the disclosure is not limited thereto. For example, the transfer of charges to the floating diffusion regions FD3 and FD4 may be first performed.

Afterwards, the analog processing circuit 123 may process the output signals OUT1 to OUT4 received from the pixel array 121.

Figure 13:
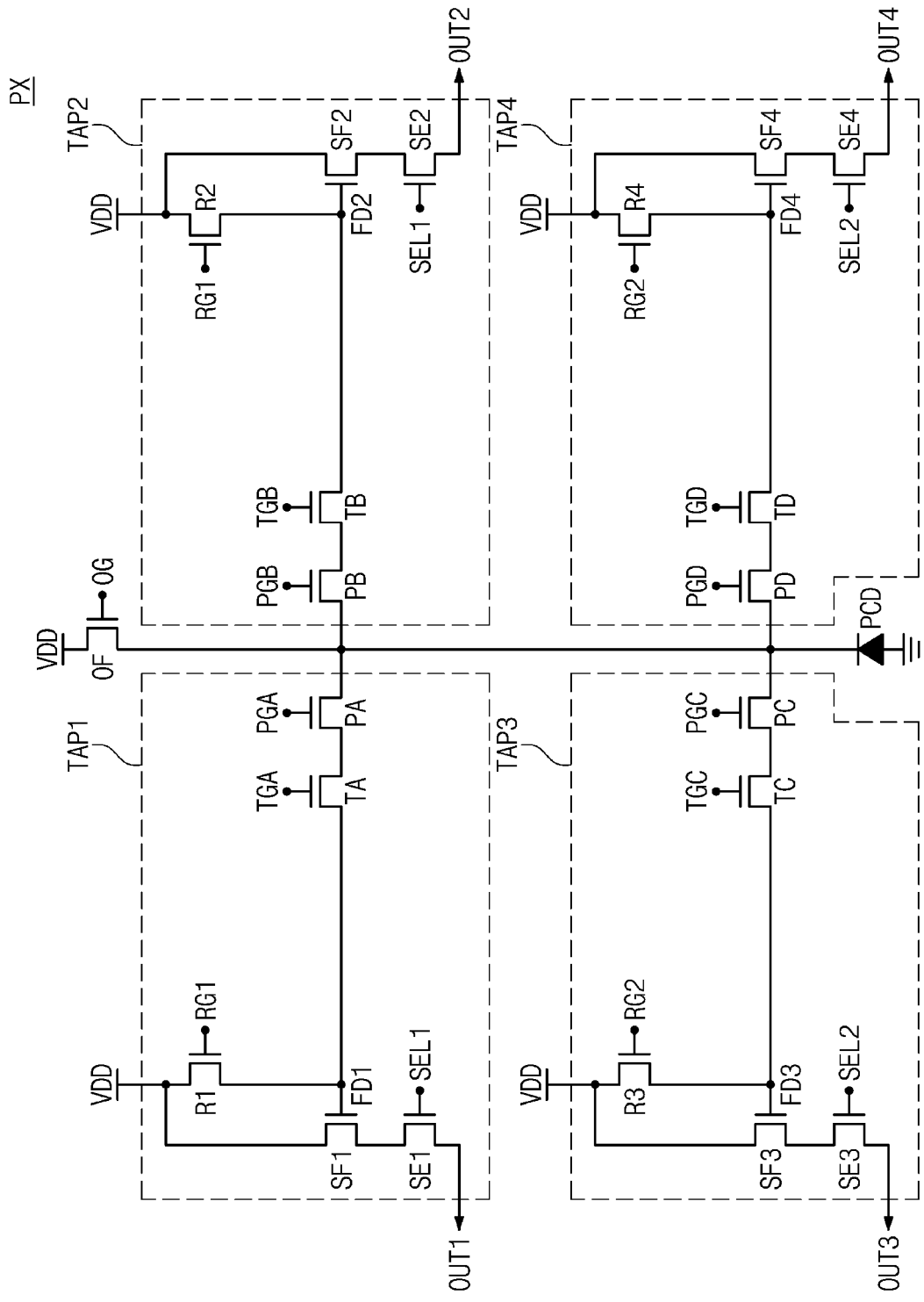
FIG. 13 is an example of a circuit diagram of a pixel of FIG. 1.
Figure 14:
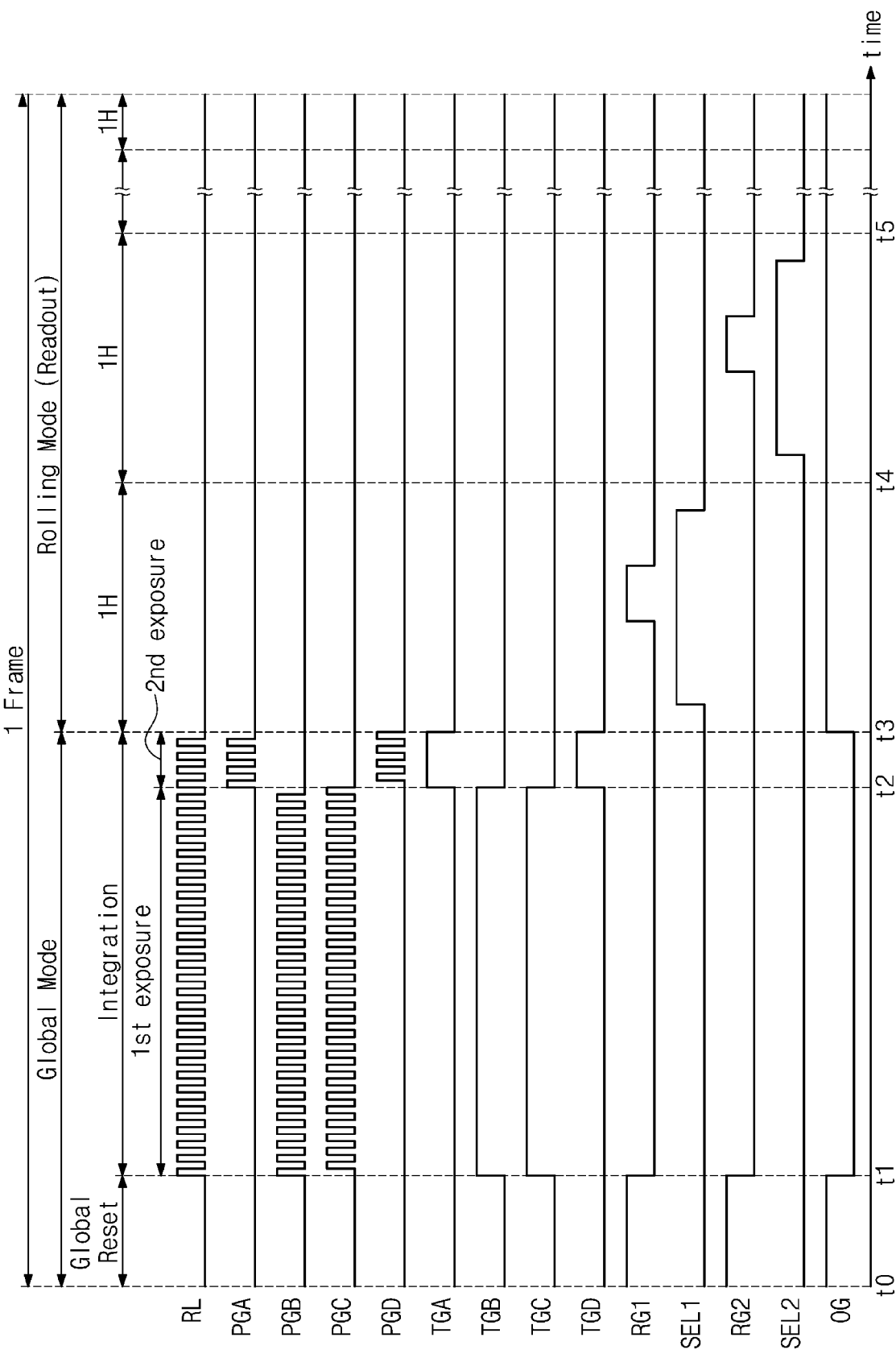
FIG. 14 illustrates an example of a timing diagram of signals that are applied to a pixel of FIG. 13.

FIG. 13 is an example of a circuit diagram of a pixel of FIG. 1. FIG. 14 illustrates an example of a timing diagram of signals that are applied to a pixel of FIG. 13.

In an embodiment, operations of components illustrated in FIG. 13 may be similar to the operations of the components illustrated in FIG. 2. For example, the pixel PX may include the photoelectric conversion device PCD, the taps TAP1 to TAP4, and the overflow transistor OF. The tap TAP1 may include the photo transistor PA, the transfer transistor TA, the floating diffusion region FD1, the reset transistor R1, the source follower transistor SF1, and the select transistor SE1. However, because the pixel PX of FIG. 13 does not include the storage transistors S1 to S4 and the transfer transistors T1 to T4 of the pixel PX illustrated in FIG. 2, an operation timing of the components included in the pixel PX of FIG. 13 may be slightly different from that of the pixel PX of FIG. 2. Therefore, an operation of the pixel PX will be described with reference to FIGS. 13 and 14 together.

A period for reading out one frame may be divided into an interval of the global mode in which all the pixels PX of the pixel array 121 (refer to FIG. 1) operate at the same time and an interval of the rolling mode in which the pixels PX operate in units of row. A global reset period of the global mode may include an interval from t0 to t1. An integration period of the global mode may include an interval from t1 to t3. longer exposure-related operations performed during a first integration period t1 to t2 and the shorter exposure-related operations performed during a second integration period t2 to t3 are similar to those of the embodiment described with reference to FIG. 6A.

However, because the pixel PX does not include the storage transistors S1 to S4 and the transfer transistors T1 to T4 of the pixel PX illustrated in FIG. 2, charges integrated during the first integration period t1 to t2 may be directly transferred to the floating diffusion regions FD2 and FD3, and charges integrated during the second integration period t2 to t3 may be directly transferred to the floating diffusion regions FD1 and FD4. The reset gate signals RG1 and RG2 may be deactivated during the integration period t1 to t3 to store charges in the floating diffusion regions FD1 to FD4.

A readout period of the rolling mode may include a plurality of 1H intervals. For example, the first 1H interval may include an interval from t3 to t4, and the second 1H interval may include an interval from t4 to t5. The first 1H interval t3 to t4 may be associated with a readout operation for the taps TAP1 and TAP2, and the second 1H interval t4 to t5 may be associated with a readout operation for the taps TAP3 and TAP4. During the interval from t3 to t4 and the interval from t4 to t5, the photo gate signals PGA to PGD and the transfer gate signals TGA to TGD may be deactivated (i.e., to the low level), and the overflow gate signal OG may be activated (i.e., to the high level).

In an interval in which the selection signal SEL1 is activated, during an inactive interval immediately before the reset gate signal RG1 is activated, that is, from a low-to-high transition of the selection signal SEL1 to (immediately before) a low-to-high transition of the reset gate signal RG1, the output signals OUT1 and OUT2 corresponding to potentials of charges stored in the floating diffusion regions FD1 and FD2 may be output to the analog processing circuit 123 (refer to FIG. 1) through the select transistors SE1 and SE2 turned on by the selection signal SEL1, respectively. In an interval in which the selection signal SEL2 is activated, during an inactive interval immediately before the reset gate signal RG2 is activated, that is, from a low-to-high transition of the selection signal SEL2 to (immediately before) a low-to-high transition of the reset gate signal RG2, the output signals OUT3 and OUT4 corresponding to potentials of charges stored in the floating diffusion regions FD3 and FD4 may be output to the analog processing circuit 123 (refer to FIG. 1) through the select transistors SE3 and SE4 turned on by the selection signal SEL2, respectively.

Figure 15:
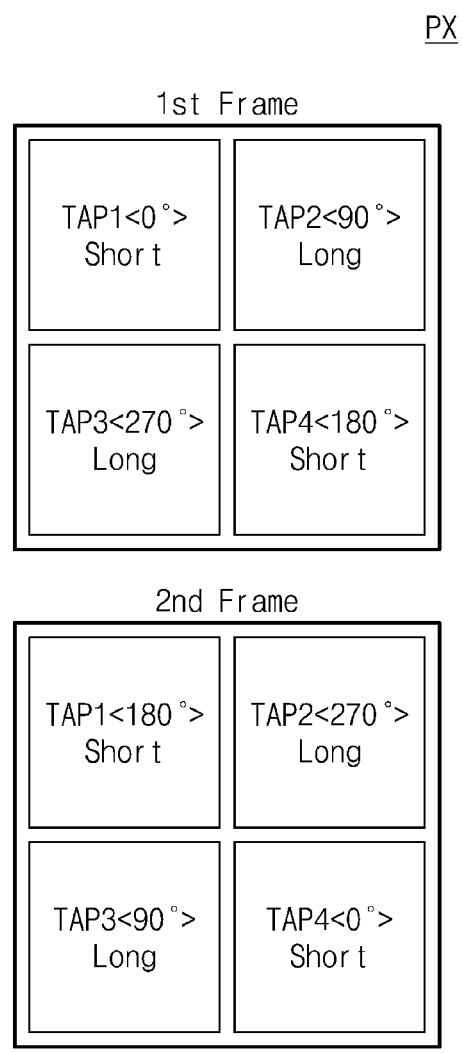
FIG. 15 conceptually illustrates image processing of an electronic device according to an example embodiment.

FIG. 15 conceptually illustrates image processing of an electronic device according to an example embodiment.

Referring together to FIGS. 6A, 6B, and 15, first, an operation in a first frame will be performed. As described above, charges may be accumulated (or integrated) by the taps TAP2 and TAP3 during the first integration period of the global mode associated with the first frame. Charges may be accumulated (or integrated) by the taps TAP1 and TAP4 during the second integration period of the global mode associated with the first frame.

In an embodiment, a phase difference of the photo gate signals PGB and PGC of the taps TAP2 and TAP3 may be 180 degrees, and a phase difference of the photo gate signals PGA and PGD of the taps TAP1 and TAP4 may be 180 degrees. That is, in the first frame, a phase of the photo gate signal PGA of the tap TAP1 may be 0 degree, a phase of the photo gate signal PGB of the tap TAP2 may be 90 degrees, a phase of the photo gate signal PGC of the tap TAP3 may be 270 degrees, and a phase of the photo gate signal PGD of the tap TAP4 may be 180 degrees.

In the rolling mode of the first frame, the tap TAP1 may output the output signal OUT1 having phase information of 0 degree, the tap TAP2 may output the output signal OUT2 having phase information of 90 degrees, the tap TAP3 may output the output signal OUT3 having phase information of 270 degrees, and the tap TAP4 may output the output signal OUT4 having phase information of 180 degrees.

Afterwards, an operation in a second frame may be performed. Charges may be accumulated (or integrated) by the taps TAP2 and TAP3 during the first integration period of the global mode associated with the second frame. Charges may be accumulated (or integrated) by the taps TAP1 and TAP4 during the second integration period of the global mode associated with the second frame. Like the first frame, a phase difference of the photo gate signals PGB and PGC of the taps TAP2 and TAP3 may be 180 degrees, and a phase difference of the photo gate signals PGA and PGD of the taps TAP1 and TAP4 may be 180 degrees.

However, phases of the photo gate signals PGA to PGD of the taps TAP1 to TAP4 associated with the second frame may be different from those associated with the first frame. For example, in the second frame, a phase of the photo gate signal PGA of the tap TAP1 may be 180 degrees, a phase of the photo gate signal PGB of the tap TAP2 may be 270 degrees, a phase of the photo gate signal PGC of the tap TAP3 may be 90 degrees, and a phase of the photo gate signal PGD of the tap TAP4 may be 0 degree.

In the rolling mode of the second frame, the tap TAP1 may output the output signal OUT1 having phase information of 180 degrees, the tap TAP2 may output the output signal OUT2 having phase information of 270 degrees, the tap TAP3 may output the output signal OUT3 having phase information of 90 degrees, and the tap TAP4 may output the output signal OUT4 having phase information of 0 degree.

That is, an order in which the taps TAP1 to TAP4 receive and store charges may be shuffled, and the analog processing circuit 123 (refer to FIG. 1) may perform analog processing based on output signals of each frame thus shuffled. As a result, a fixed pattern noise (FPN) occurring at the pixel array 121 may decrease through the above shuffling. In addition, an order in which the taps TAP1 to TAP4 receive and store charges is not limited to the example illustrated in FIG. 13.

Figure 16:
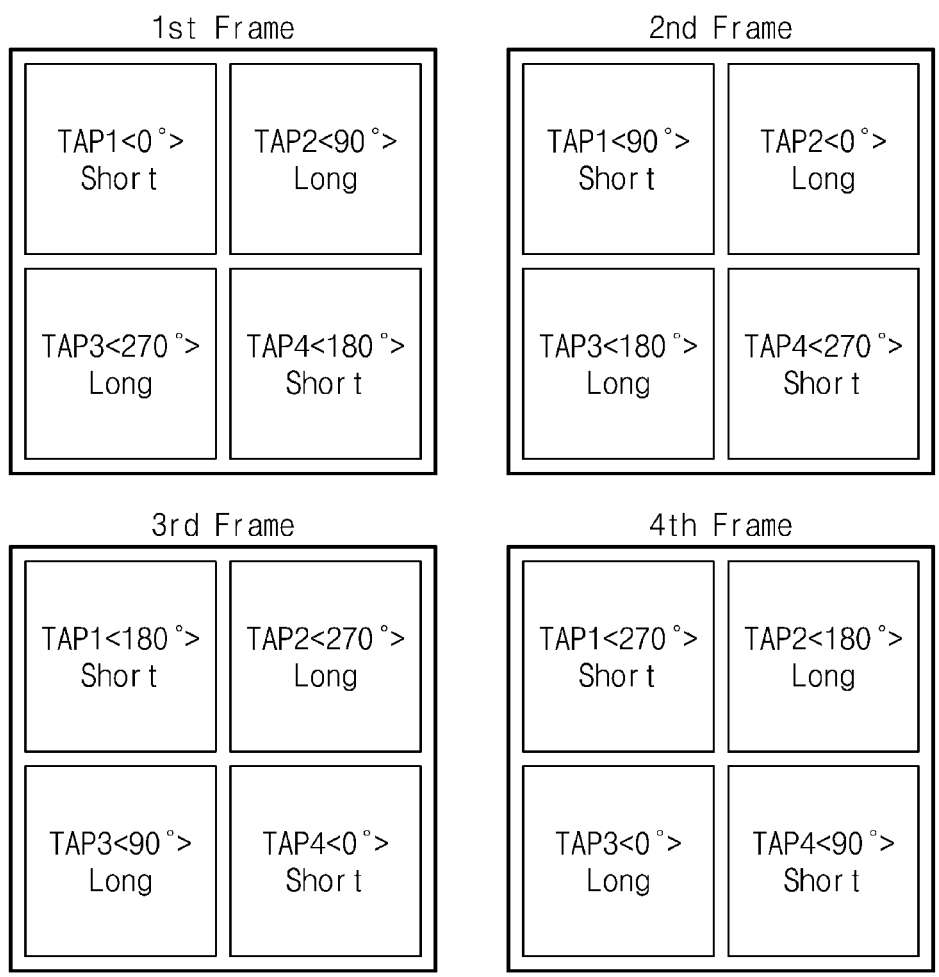
FIG. 16 conceptually illustrates image processing of an electronic device according to an example embodiment.

FIG. 16 conceptually illustrates image processing of an electronic device according to an example embodiment.

First, in the global mode of a first frame, charges may be accumulated (or integrated) by the taps TAP2 and TAP3 during the first integration period, and charges may be accumulated (or integrated) by the taps TAP1 and TAP4 during the second integration period. In this case, phases of the photo gate signals PGA, PGB, PGC, and PGD of the taps TAP1 to TAP4 may be 0 degree, 90 degrees, 270 degrees, and 180 degrees, respectively. In the rolling mode of the first frame, the tap TAP1 may output the output signal OUT1 having phase information of 0 degree, the tap TAP2 may output the output signal OUT2 having phase information of 90 degrees, the tap TAP3 may output the output signal OUT3 having phase information of 270 degrees, and the tap TAP4 may output the output signal OUT4 having phase information of 180 degrees.

In the global mode of a second frame, charges may be accumulated (or integrated) by the taps TAP2 and TAP3 during the first integration period, and charges may be accumulated (or integrated) by the taps TAP1 and TAP4 during the second integration period. In this case, phases of the photo gate signals PGA, PGB, PGC, and PGD of the taps TAP1 to TAP4 may be 90 degrees, 0 degree, 180 degrees, and 270 degrees. In the rolling mode of the second frame, the tap TAP1 may output the output signal OUT1 having phase information of 90 degrees, the tap TAP2 may output the output signal OUT2 having phase information of 0 degree, the tap TAP3 may output the output signal OUT3 having phase information of 180 degrees, and the tap TAP4 may output the output signal OUT4 having phase information of 270 degrees.

In the global mode of a third frame, charges may be accumulated (or integrated) by the taps TAP2 and TAP3 during the first integration period, and charges may be accumulated (or integrated) by the taps TAP1 and TAP4 during the second integration period. In this case, phases of the photo gate signals PGA, PGB, PGC, and PGD of the taps TAP1 to TAP4 may be 180 degrees, 270 degrees, 90 degrees, and 0 degree. In the rolling mode of the third frame, the tap TAP1 may output the output signal OUT1 having phase information of 180 degrees, the tap TAP2 may output the output signal OUT2 having phase information of 270 degrees, the tap TAP3 may output the output signal OUT3 having phase information of 90 degrees, and the tap TAP4 may output the output signal OUT4 having phase information of 0 degree.

In the global mode of a fourth frame, charges may be accumulated (or integrated) by the taps TAP2 and TAP3 during the first integration period, and charges may be accumulated (or integrated) by the taps TAP1 and TAP4 during the second integration period. In this case, phases of the photo gate signals PGA, PGB, PGC, and PGD of the taps TAP1 to TAP4 may be 270 degrees, 180 degrees, 0 degree, and 90 degrees. In the rolling mode of the fourth frame, the tap TAP1 may output the output signal OUT1 having phase information of 270 degrees, the tap TAP2 may output the output signal OUT2 having phase information of 180 degrees, the tap TAP3 may output the output signal OUT3 having phase information of 0 degree, and the tap TAP4 may output the output signal OUT4 having phase information of 90 degrees.

That is, the fixed pattern noise (FPN) occurring at the pixel array 121 (refer to FIG. 1) may be further reduced through a 4-shuffle operation. An order in which the taps TAP1 to TAP4 receive and store charges is not limited to the example illustrated in FIG. 16.

Figure 17:
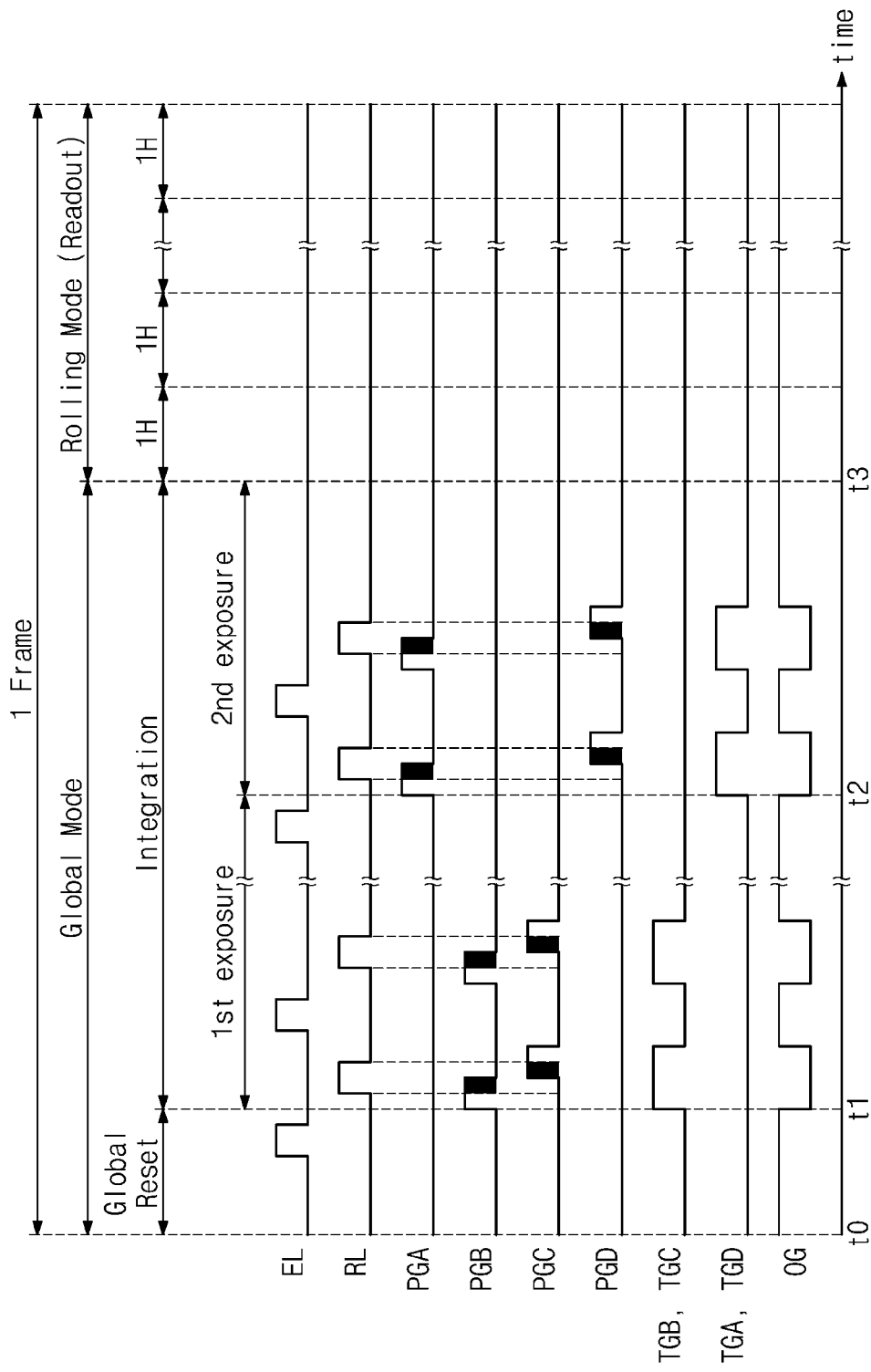
FIG. 17 illustrates a timing diagram of signals that are applied to a pixel of FIG. 2.

FIG. 17 illustrates an example of a timing diagram of signals that are applied to a pixel of FIG. 2.

The above-described embodiments may be associated with the case where the light signal RL is a continuous wave in which a duty ratio is 50%, while the embodiment of FIG. 17 may be associated with the case where a duty ratio is less than 50%. However, the embodiment of FIG. 17 may be similar to the above embodiments in that at least two readout operations are performed based on charges accumulated (or integrated) by respective taps during different times. For better understanding, the description will be given with reference to FIG. 2 together.

In an embodiment, during the first integration period t1 to t2 of the global mode, charges may be stored by the storage transistor S2 of the tap TAP2 in an interval (i.e., a shaded portion) in which pulses of the photo gate signal PGB and the light signal RL overlap each other. Charges may be stored by the storage transistor S3 of the tap TAP3 in an interval in which pulses of the photo gate signal PGC, the phase of which is delayed with respect to a phase of the photo gate signal PGB, and the light signal RL overlap each other. For example, as the first integration period increases, the amount of charges stored by the storage transistors S2 and S3 may increase (long exposure).

In an embodiment, during the second integration period t2 to t3 of the global mode, charges may be stored by the storage transistor S1 of the tap TAP1 in an interval (i.e., a shaded portion) in which pulses of the photo gate signal PGA and the light signal RL overlap each other. Charges may be stored by the storage transistor S4 of the tap TAP4 in an interval in which pulses of the photo gate signal PGD, the phase of which is delayed with respect to a phase of the photo gate signal PGA, and the light signal RL overlap each other. For example, the second integration period may be shorter than the first integration period (shorter exposure).

Afterwards, as in the above description given with reference to FIG. 6B, in the first 1H interval of the rolling mode of the first frame, a readout operation may be performed on the taps TAP1 and TAP2, and thus the output signals OUT1 and OUT2 may be output; in the second 1H interval of the rolling mode of the first frame, a readout operation may be performed on the taps TAP3 and TAP4, and thus the output signals OUT3 and OUT4 may be output. Thus, additional description will be omitted to avoid redundancy.

In an embodiment, a manner of generating a depth map by using a pulsed wave is not limited to the embodiment disclosed in FIG. 17. For example, in an embodiment, as illustrated in FIG. 7, the shorter exposure may be performed prior to the longer exposure, and the embodiments of FIGS. 8A to 11 may be identically applied to generate a depth map by using a pulsed wave. In addition, the shuffling described with reference to FIGS. 15 and 16 may be identically applied to generate a depth map by using a pulsed wave.

According to the embodiments described above, in one frame, at least two readout operations may be performed based on charges integrated by different taps during different times. As such, an output signal that may be used to sense a longer-range object as well as an output signal that may be used to sense a short-range object may be generated. Accordingly, a dynamic range of a depth map may increase, and a high dynamic range (HDR) may be implemented.

According to the disclosure, output signals may be generated based on charges stored during different integration periods through only one read operation in one frame.

As a result, a depth map may be generated based on signals capable of sensing both a short-range object and a longer-range object, and thus a dynamic range of the depth map may be improved.

While the disclosure has been described with reference to example embodiments thereof, it will be apparent to those of ordinary skill in the art that various changes and modifications may be made thereto without departing from the spirit and scope of the disclosure as set forth in the following claims and their equivalents.

What is claimed is:

1. A depth sensor comprising:
   a pixel including a first tap, a second tap, a third tap, a fourth tap, an overflow transistor, and a photoelectric conversion device, each tap of the first tap, the second tap, the third tap, and the fourth tap including a photo transistor, a transfer transistor, and a readout circuit; and
   a row driver configured to control the pixel,
   wherein the row driver is further configured to:
   in a first integration period of a global mode, activate a second photo gate signal controlling the photo transistor of the second tap and a third photo gate signal controlling the photo transistor of the third tap; and
   in a second integration period of the global mode, activate a first photo gate signal controlling the photo transistor of the first tap and a fourth photo gate signal controlling the photo transistor of the fourth tap.

2. The depth sensor of claim 1, wherein the row driver is further configured to:
   in the first integration period of the global mode, activate a second transfer control signal controlling the transfer transistor of the second tap and a third transfer control signal controlling the transfer transistor of the third tap; and
   in the second integration period of the global mode, activate a first transfer control signal controlling the transfer transistor of the first tap and a fourth transfer control signal controlling the transfer transistor of the fourth tap.

3. The depth sensor of claim 1, wherein the row driver is further configured to activate, prior to the first integration period and the second integration period of the global mode, an overflow gate signal controlling the overflow transistor.

4. The depth sensor of claim 1, wherein the row driver is further configured to activate, prior to the second integration period of the global mode, an overflow gate signal controlling the overflow transistor.

5. The depth sensor of claim 1, wherein the row driver is further configured to:
   select, in a first interval of a rolling mode after the global mode, the first tap and the second tap; and
   select, in a second interval after the first interval, the third tap and the fourth tap.

6. The depth sensor of claim 5, wherein the readout circuit of each of the first tap, the second tap, the third tap, and the fourth tap includes:
   a reset transistor including a first end connected with a corresponding floating diffusion region and a second end connected with a power supply voltage;
   a source follower transistor including a gate electrode connected with the corresponding floating diffusion region and a first end connected with the power supply voltage; and
   a select transistor including a first end connected with a second end of the source follower transistor and a second end connected with a corresponding output line.

7. The depth sensor of claim 6, wherein the row driver is further configured to:
   in the first interval of the rolling mode, activate a first selection signal controlling the select transistor of the first tap and a second selection signal controlling the select transistor of the second tap; and
   in the second interval of the rolling mode, activate a third selection signal controlling the select transistor of the third tap and a fourth selection signal controlling the select transistor of the fourth tap.

8. The depth sensor of claim 7, wherein, in the first interval of the rolling mode, after the first selection signal controlling the select transistor of the first tap and the second selection signal controlling the select transistor of the second tap are activated, the reset transistor of the first tap and the reset transistor of the second tap are activated, and
   wherein, in the second interval of the rolling mode, after the third selection signal controlling the select transistor of the third tap and the fourth selection signal controlling the select transistor of the fourth tap are activated, the reset transistor of the third tap and the reset transistor of the fourth tap are activated.

9. The depth sensor of claim 1, wherein a length of the first integration period is different from a length of the second integration period.

10. The depth sensor of claim 1, wherein a phase of the second photo gate signal is opposite to a phase of the third photo gate signal, and a phase of the first photo gate signal is opposite to a phase of the fourth photo gate signal.

11. A depth sensor comprising:
    a pixel including a first tap, a second tap, a third tap, a fourth tap, an overflow transistor connected in common with the first tap, the second tap, the third tap, and the fourth tap, and a photoelectric conversion device connected in common with the first tap, the second tap, the third tap, and the fourth tap; and
    a row driver configured to control the pixel,
    wherein, in a first integration period of a global mode, the second tap and the third tap are configured to store charges converted by the photoelectric conversion device, and
    wherein, in a second integration period of the global mode, the first tap and the fourth tap are configured to store charges converted by the photoelectric conversion device.

12. The depth sensor of claim 11, wherein each of the first tap, the second tap, the third tap, and the fourth tap includes a photo transistor, a first transfer transistor, a storage transistor, a second transfer transistor, and a readout circuit, and
    wherein the readout circuit of each of the first tap, the second tap, the third tap, and the fourth tap includes:
    a reset transistor including a first end connected with a corresponding floating diffusion region and a second end connected with a power supply voltage;
    a source follower transistor including a gate electrode connected with the corresponding floating diffusion region and a first end connected with the power supply voltage; and
    a select transistor including a first end connected with a second end of the source follower transistor and a second end connected with a corresponding output line.

13. The depth sensor of claim 12, wherein the row driver is further configured to:
    in the first integration period of the global mode, activate a second transfer control signal controlling the first transfer transistor of the second tap and a third transfer control signal controlling the first transfer transistor of the third tap; and
    wherein, in the second integration period of the global mode, activate a first transfer control signal controlling the first transfer transistor of the first tap and a fourth transfer control signal controlling the first transfer transistor of the fourth tap.

14. The depth sensor of claim 12, wherein the row driver is further configured to:
   select, in a first interval of a rolling mode after the global mode, the first tap and the second tap; and
   select, in a second interval after the first interval, the third tap and the fourth tap.

15. The depth sensor of claim 14, wherein the row driver is further configured to:
   in the first interval of the rolling mode, activate a control signal controlling the second transfer transistor of the first tap and a control signal controlling the second transfer transistor of the second tap; and
   in the second interval of the rolling mode, activate a control signal controlling the second transfer transistor of the third tap and a control signal controlling the second transfer transistor of the fourth tap.

16. The depth sensor of claim 15, wherein the row driver is further configured to:
   in the first interval of the rolling mode, activate a first selection signal controlling the select transistor of the first tap and a second selection signal controlling the select transistor of the second tap; and
   in the second interval of the rolling mode, activate a third selection signal controlling the select transistor of the third tap and a fourth selection signal controlling the select transistor of the fourth tap.

17. The depth sensor of claim 11, wherein a length of the first integration period is different from a length of the second integration period.

18. A method of operating a depth sensor which includes a pixel including a first tap, a second tap, a third tap, and a fourth tap and an analog processing circuit, the method comprising:
   receiving a light signal reflected from an object;
   storing first charges converted by a photoelectric conversion device in the second tap and the third tap, during a first integration period of a global mode; and
   storing second charges converted by the photoelectric conversion device in the first tap and the fourth tap, during a second integration period of the global mode.

19. The method of claim 18, further comprising:
   outputting, in a first interval of a rolling mode after the global mode, a first output signal based on charges stored in the first tap from among the second charges;
   outputting, in the first interval of the rolling mode, a second output signal based on charges stored in the second tap from among the first charges;
   outputting, in a second interval after the first interval, a third output signal based on charges stored in the third tap from among the first charges;
   outputting, in the second interval of the rolling mode, a fourth output signal based on charges stored in the fourth tap from among the second charges; and
   processing, by the depth sensor, the first output signal, the second output signal, the third output signal, and the fourth output signal.

20. The method of claim 18, wherein a length of the first integration period is different from a length of the second integration period.

* * * * *